United States Patent
Kidambi et al.

(10) Patent No.: US 10,157,238 B2
(45) Date of Patent: Dec. 18, 2018

(54) TRANSFORMATION OF MARKED-UP CONTENT TO A REVERSIBLE FILE FORMAT FOR AUTOMATED BROWSER BASED PAGINATION

(71) Applicant: TNQ Books and Journals Private Limited, Chennai (IN)

(72) Inventors: Venkatesan Sumangali Kidambi, Chennai (IN); Srikanth Vittal, Chennai (IN); Bhaskar Mannargudi Venkatraman, Chennai (IN)

(73) Assignee: TNQ BOOKS AND JOURNALS PRIVATE LIMITED, Chennai (IN)

( * ) Notice: Subject to any disclaimer, the term of this patent is extended or adjusted under 35 U.S.C. 154(b) by 0 days.

(21) Appl. No.: 15/551,292

(22) PCT Filed: Jun. 22, 2016

(86) PCT No.: PCT/IN2016/000159
§ 371 (c)(1),
(2) Date: Aug. 16, 2017

(87) PCT Pub. No.: WO2017/002130
PCT Pub. Date: Jan. 5, 2017

(65) Prior Publication Data
US 2018/0239775 A1     Aug. 23, 2018

(30) Foreign Application Priority Data
Jul. 1, 2015   (IN) ............................ 3348/CHE/2015

(51) Int. Cl.
*G06F 17/00*     (2006.01)
*G06F 17/30*     (2006.01)
*G06F 17/21*     (2006.01)

(52) U.S. Cl.
CPC ........ *G06F 17/3092* (2013.01); *G06F 17/217* (2013.01); *G06F 17/218* (2013.01); *G06F 17/30905* (2013.01)

(58) Field of Classification Search
CPC ............................. G06F 17/211; G06F 17/217
See application file for complete search history.

(56) References Cited

U.S. PATENT DOCUMENTS 5,336,124 A * 8/1994 Garside .................. A22B 5/161
                                                    452/125
5,779,154 A * 7/1998 Martin .................. B05B 7/2462
                                                    239/310

(Continued)

OTHER PUBLICATIONS

Alfie Abdul-Rahman, Roger Gimson, John Lumley, Automatic Pagination of HTML Documents in a Web Browser, Hewlett-Packard Labs, Long Down Avenue, Bristol BS34 8QZ, UK {alfie.abdul-rahman, roger.gimson, john.lumley}@hp.com, Jul. 24, 2009.

*Primary Examiner* — Laurie A Ries
(74) *Attorney, Agent, or Firm* — Ashok Tankha; Lipton, Weinberger & Husick

(57) ABSTRACT

A method and a file format transformation system (FFTS) for transforming marked-up content in a first file format (FFF) to a reversible second file format (RSFF) are provided. The FFTS reflows marked-up content of the FFF into a continuous page. The FFTS generates and appends tags to spaces and block elements identified in the reflown marked-up content of the FFF. For each space and block element, the FFTS determines and tags line breaks in the reflown marked-up content. For each line break, the FFTS identifies, tags, and positions anchored floats and footnotes on a current page based on space availability. The FFTS positions page breaks in the continuous page based on a configurable page height and the line breaks. The FFTS groups the marked-up content, inserts pagination elements, for example, page (Continued)

numbers, etc., and renders the grouped marked-up content in the RSFF, which is reversible to restore the continuous page.

19 Claims, 32 Drawing Sheets

(56) References Cited

U.S. PATENT DOCUMENTS

| | | | | |
|---|---|---|---|---|
| 5,789,229 | A * | 8/1998 | Wertz | C07K 14/005 435/235.1 |
| 6,336,124 | B1 | 1/2002 | Alam et al. | |
| 6,556,217 | B1 * | 4/2003 | Makipaa | G06F 17/217 345/667 |
| 6,779,154 | B1 | 8/2004 | Nussbaum et al. | |
| 6,789,229 | B1 | 9/2004 | Dunietz et al. | |
| 7,028,258 | B1 * | 4/2006 | Thacker | G06F 17/217 345/660 |
| 7,496,835 | B1 * | 2/2009 | Chen | G06F 17/211 715/234 |
| 7,496,838 | B2 * | 2/2009 | Salter | G06F 17/2247 715/239 |
| 7,533,110 | B2 * | 5/2009 | Kreiner | G06F 17/2247 |
| 7,647,553 | B2 * | 1/2010 | Mogilevsky | G06F 17/212 715/234 |
| 7,653,876 | B2 * | 1/2010 | Ethier | G06F 17/218 715/249 |
| 2006/0248440 | A1 * | 11/2006 | Rhoads | G06F 17/30728 715/236 |
| 2006/0259524 | A1 * | 11/2006 | Horton | G06F 17/2288 |
| 2009/0125802 | A1 * | 5/2009 | Chen | G06F 17/2247 715/234 |
| 2009/0265339 | A1 * | 10/2009 | Chen | G06F 17/2247 |
| 2010/0177970 | A1 * | 7/2010 | King | G06F 17/218 382/229 |
| 2011/0131482 | A1 * | 6/2011 | Shteinvil | G06F 17/218 715/229 |
| 2013/0334300 | A1 * | 12/2013 | Evans | G06F 17/30017 235/375 |
| 2014/0075273 | A1 * | 3/2014 | Fisher | G06F 17/2264 715/201 |
| 2014/0331125 | A1 * | 11/2014 | Tigchelaar | G06F 17/211 715/249 |
| 2015/0199314 | A1 * | 7/2015 | Ratnakar | G06F 17/24 715/255 |
| 2017/0116179 | A1 * | 4/2017 | Gagne-Langevin | G06F 17/24 |

* cited by examiner

TRANSFORMATION OF MARKED-UP CONTENT TO A REVERSIBLE FILE FORMAT FOR AUTOMATED BROWSER BASED PAGINATION

CROSS-REFERENCE TO RELATED APPLICATIONS

This application is a national stage application of the PCT international application titled "Transformation Of Marked-up Content To A Reversible File Format For Automated Browser Based Pagination", international application number PCT/IN2016/000159, filed in the Indian Patent Office on Jun. 22, 2016, which claims priority to and the benefit of non-provisional patent application titled "Transformation Of Marked-Up Content To A Reversible File Format For Automated Browser Based Pagination", non-provisional patent application number 3348/CHE/2015, filed in the Indian Patent Office on Jul. 1, 2015. The specifications of the above referenced patent applications are incorporated herein by reference in their entirety.

BACKGROUND

With the increase in internet usage and applications, users are now accessing information and searching for information online. Information on the web is typically represented through electronic documents created using markup languages. Electronic documents created using markup languages are easily accessible to users through a typical web browser. A typical markup language document is made of different types of content, for example, textual content, images, videos, etc., and carries syntax information that instructs a browser how to render different types of content in the markup language document to a user. The syntax information comprises a set of markup language tags that are executed on the browser. Furthermore, rendering a document on a browser can be controlled, for example, by using cascading style sheets (CSS) that describe the formatting of a document written in a markup language. A CSS document is typically attached, embedded, or linked to a markup language document. The CSS defines how each element, for example, font size of text, color of a background or text, position and alignment of content elements, etc., in the markup language document appears on the browser.

Conventional markup language documents are typically displayed as continuous running documents without any page breaks. These continuous running documents are not print-friendly. A typical markup language document can accommodate a large amount of content, whereas a standard print ready page has, for example, 8.5"×11" dimensions with margins that reduce the space available for accommodation of a large amount of content during a print operation. The content has to be broken at two levels, that is, a horizontal level or page width and a vertical level or page height. The page width relates to a line break, and the page height relates to a page break. Content rendering on a browser can have loose lines, and spaces are often distributed in ways that make a page appear to have rivers of blanks flowing through the page. How the browser renders this content has to be understood in order to meaningfully interpret the content subsequently. Line breaks rendered by the browser can be discerned as belonging to four different types, namely, word space breaks (wsbr), soft hyphen breaks (wshbr), hard breaks (wbr), and para breaks (wsp). Word space breaks are discerned by finding which spaces are quashed to a zero width. The word space breaks are then interpreted as the end of a line or a line break. Similarly, for manually introduced soft hyphens, if a line breaks in a soft hyphen, then the soft hyphen attains a non-zero width which is also interpreted as the end of the line or as a line break. A hard line break can be discerned when an offset decrease is encountered. Therefore, any markup language content that falls outside a printing area needs to be resized and repositioned accordingly for an optimal print output without losing any data when a print operation is performed.

One method for printing continuous running pages involves introducing page breaks based on a vertical height equal to a page of printing media upon which the content is to be printed. The problem with relying on introducing page breaks based on the vertical height is that text lines and other content are disrupted in between a page and the same is printed. There are additional problems, for example, numbering the pages as page numbers are forced and not based on the content, page layout issues on print media and on handheld devices, etc. Floats such as images and tables can split and spill across pages and trying to avoid these can result in large vertical gaps, making the presentation undesirable.

Content in a document can be easily read by a computer when the content is marked up. In markup language documents, for example, hypertext markup language (HTML) documents, word spaces and line breaks are not explicitly tagged. The word spaces and the line breaks remain anonymous, for example, as generic word spaces and line breaks, and hence are difficult to read and understand for printing accurately. With the advent of handheld devices, for example, smartphones, tablets, etc., there is a need for an optimized rendering of markup language documents and hence the concept of a fluid page was originated. The non-print-friendly documents, page numbering issues, and other page layout problems still exist in fluid pages. There is a need for bridging fluid web-content and fixed-page typesetting originating as a fluid HTML, without a reference printer at the destination.

Markup language documents are typically interactive and dynamic in nature, whereas the print is essentially static in nature. For example, hypertext markup language (HTML) documents contain free flowing or reflowing content. Images, paragraphs, videos and other similar content are arranged in an HTML document as tags. HTML documents are adaptable to different devices. That is, if an HTML document is viewed in a web browser, then the HTML document adapts to the web browser and displays content of the HTML document as per the specifications of the web browser. If this HTML document is viewed on a mobile browser of a mobile device, then the HTML document adapts to the specifications of the mobile browser. However, the HTML content is not suitable to print. Since the HTML content is not fixed, a printer would interpret specific elements of the HTML content inaccurately and therefore print the HTML content inaccurately. While there are many transformation techniques and file formats, these file formats are not reversible and do not restore fluidity of the transformed markup language documents. One of the main reasons that the fluidity cannot be restored is that the page output in non-reversible file formats are defined graphically as a set of printer instructions at a glyph level that lose structural information at a character level and a content level.

Markup language content and associated content elements are interpreted and defined using markup language tags on any standard web browser. The tags included in a markup language document are typically executed on a server or on a web browser. Scripts or tags that run directly on a web browser have less latency time compared to a server side execution of tags. Moreover, a server side execution of tags requires an active network connection, whereas a client side execution of web browser compatible tags runs without an active network connection. Most textual markup language documents are rendered in a client-server architecture, where there are delays and additional communication cost between a server and a user's client device for presenting and printing markup language documents. Pagination of a hypertext markup language (HTML) document involves partitioning content of the HTML document and presenting the partitioned content on individual pages. Conventional solutions include pagination of HTML documents based either on cut-off markers or the number of items to be displayed per page. These solutions are typically implemented using server side technologies. There is a need for a client side implementation, and there have been a few attempts at client side pagination due to the improved performance that the client side pagination can yield.

U.S. Pat. No. 7,647,553 B2 provides a hypertext markup language view template that allows a hypertext markup language content document to flow into a series of containers. This is performed by identifying the layout of the hypertext markup language document by using view templates. In this method, a hypertext markup language authorship is provided that takes a bottomless continuous running hypertext markup language page and positions the content in a series of predefined containers within the display media. The content is flowed into the predefined containers. This method does not handle the positioning of footnotes on the same page where respective footnote citations reside, which makes it difficult for a user to refer to citations. This method also does not place floats proximate to their corresponding citations, which makes it difficult for the user to access floats corresponding to the citations. Furthermore, this method does not address header and footer conversion issues.

U.S. Pat. No. 6,789,229 B1 addresses issues with pagination that involves more processor intensive tasks. This method uses pagination techniques that involve determining reproducible pages followed by numbering individual pages based on hard breaks. This method requires a predetermined list of hard breaks occurring in the document being processed which requires a lot of processing time to display page numbers and therefore, there is a need for a faster and efficient technique to process page numbers.

A publication by Hewlett-Packard Laboratories titled "Automatic Pagination of HTML Documents in a Web Browser" discloses automatic pagination of hypertext markup language (HTML) documents on the client side. The methods disclosed in this publication utilize a built-in library of JavaScript® functions in a browser and size attributes to format an HTML page. The paginations are performed through extensible stylesheet language transformation (XSLT). These pagination techniques render page numbers in tabs which occupy more space if the number of pages is large. These methods do not handle page numbers when a print operation is initiated. Moreover, these methods do not position floats and footnotes on the same page where their respective citations reside. These methods transform a regular HTML page into individual pages with paginated tabs, but do not efficiently handle a journal or a novel style HTML page which translates to hundreds or even thousands of individual pages.

Conventional file formats, for example, the portable document format (PDF) of Adobe Systems Incorporated and the electronic publication (ePub®) format of Open eBook Forum DBA are two typical file formats used in documentation. The portable document format is based on a fixed layout and does not support a fluid layout. Page numbers in the portable document format are forced and not based on the content. The ePub file format is designed with reflowable content, which can optimize text and graphics according to a display device. However, the ePub file format does not support header and footer at a conversion stage, places floats at random locations, and does not proxy floats, for example, videos and long tables to a linked source, thereby hindering the user experience.

Hence, there is a long felt but unresolved need for a computer implemented method and a file format transformation system deployed on a client device that transforms marked-up content in a first file format, for example, a hypertext markup language (HTML) format to a reversible second file format that can be stored offline, executed with less latency and without an active network connection on any browser on any operating system, and can be restored to a continuous page. Moreover, there is a need for a computer implemented method and a file format transformation system that implements document tagging of all content including spaces and line breaks to transform fluid pages to fixed pages that are print-friendly and provide a fixed page view that captures document elements, for example, line breaks, floats, footnotes or end notes, page numbers, headers and footers, captions, etc., which are expressed relationally and assigned page appropriate placement. Furthermore, there is a need for a computer implemented method and a file format transformation system that position floats and footnotes on the same page where their respective citations reside, support headers and footers at a conversion stage, place floats at appropriate locations, and proxy floats, for example, videos and long tables to a linked source, thereby enhancing the user experience.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the file format transformation system (FFTS) disclosed herein address the above stated need for transforming marked-up content in a first file format, for example, a hypertext markup language (HTML) format to a reversible second file format that can be stored offline, executed with less latency and without an active network connection on any browser on any operating system, and can be restored to a continuous page. Moreover, the method and the FFTS disclosed herein implement document tagging of all content including spaces and line breaks to transform fluid pages to fixed pages that are print-friendly and provide a fixed page view that captures document elements, for example, line breaks, floats, footnotes or end notes, page numbers, headers and footers, captions, etc., which are expressed relationally and assigned page appropriate placement. In the absence of tags for blanks, for example, word spaces and line breaks, it would be difficult to instruct and cajole a browser to reflow content, thereby limiting the scope to the browser's default content flow. Consequently, a meaningful page break cannot be assigned and scripts that interpret the tags to produce page breaks do not have handles with which to produce the page breaks. In the reversible second file format disclosed herein, word spaces, line breaks, and page breaks are explicitly tagged. The FFTS therefore generates fixed format virtual pages in the reversible second file format with line breaks and page breaks placed in appropriate locations within a continuous document. In a virtual page rendering, the continuous page is first rendered with demarcation lines or page borders for page breaks. A cascading style sheet (CSS) instruction is provided to a printer to not print the demarcation lines but interpret them instead as page breaks.

The client side implementation of the method and the file format transformation system (FFTS) disclosed herein allows a user of a document to be presented with an alternate presentation of the document without additional communication costs between a server and the user's client device. Moreover, the client side implementation of the method and the FFTS disclosed herein enables automated browser based pagination of markup language documents, for example, hypertext markup language (HTML) documents based on the dimensions of a web browser's window and the rendered size of components. The reversible file format allows a user to view the page-broken document as a continuous document on a browser. The user can switch between the two views. The computer implemented method and the FFTS disclosed herein position floats and footnotes on the same page where their respective citations reside, support headers and footers at a conversion stage, place floats at appropriate locations, and proxy floats, for example, videos and long tables to a linked source, thereby enhancing the user experience. The computer implemented method disclosed herein is minimalistic in terms of document object model (DOM) manipulation and performs minimum manipulation to create pages.

The computer implemented method disclosed herein employs the file format transformation system (FFTS) deployed on a client device comprising at least one processor configured to execute computer program instructions for transforming marked-up content in a first file format to a reversible second file format. The FFTS receives the marked-up content of the first file format. The FFTS reflows the received marked-up content of the first file format into a continuous page having a configurable page width. The FFTS identifies spaces and block elements in the reflown marked-up content of the first file format. The FFTS generates and appends tags to the identified spaces and the identified block elements in the reflown marked-up content of the first file format. For each of the identified spaces and the identified block elements, the FFTS determines line breaks in the reflown marked-up content of the first file format based on preconfigured criteria associated with the appended tags and tags the determined line breaks.

For each of the determined line breaks, the FFTS identifies anchored floats, for example, figures, tables, images, videos, etc., in the reflown marked-up content of the first file format and tags the identified anchored floats. The FFTS positions the tagged anchored floats on a current page based on availability of space for the tagged anchored floats on the current page. The FFTS identifies footnotes in the reflown marked-up content of the first file format and tags the identified footnotes. The FFTS positions the tagged footnotes at a footnote section on the current page based on availability of space for the tagged footnotes on the current page. The FFTS positions page breaks in the continuous page based on a configurable page height and the determined line breaks for the positioning of the tagged anchored floats and the tagged footnotes on a subsequent page on non-availability of the space on the current page. The FFTS groups the marked-up content with the positioned anchored floats and the positioned footnotes on each page. The FFTS inserts one or more of multiple pagination elements, for examples, page numbers, a header, a footer, etc., on each page containing the grouped marked-up content. The FFTS renders the grouped marked-up content with the inserted pagination elements in the reversible second file format. The method disclosed herein performs tagging of the spaces and the block elements with <span data-ph5="ws"> and <span data-ph5="wsp">, and tagging the line breaks with <span data-ph5="wsbr">, the para breaks with <span data-ph5="wsp">, etc. The reversible second file format allows the marked-up content to be reversed to the first file format, restoring continuity, for example, by converting <span data-ph5="wsbr"> and <span data-ph5="wsp"> back to <span data-ph5=WS>. The data-ph5 attribute described above pertains to hypertext markup language5 (HTML5). For backward compatibility with HTML 4, the "class" attribute can be used instead of the data-ph5 attribute. It may be noted that "class'" attribute expressions in legacy HTML impose certain limitations to reversibility compared to the data-ph5 attribute in HTML5.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1A:
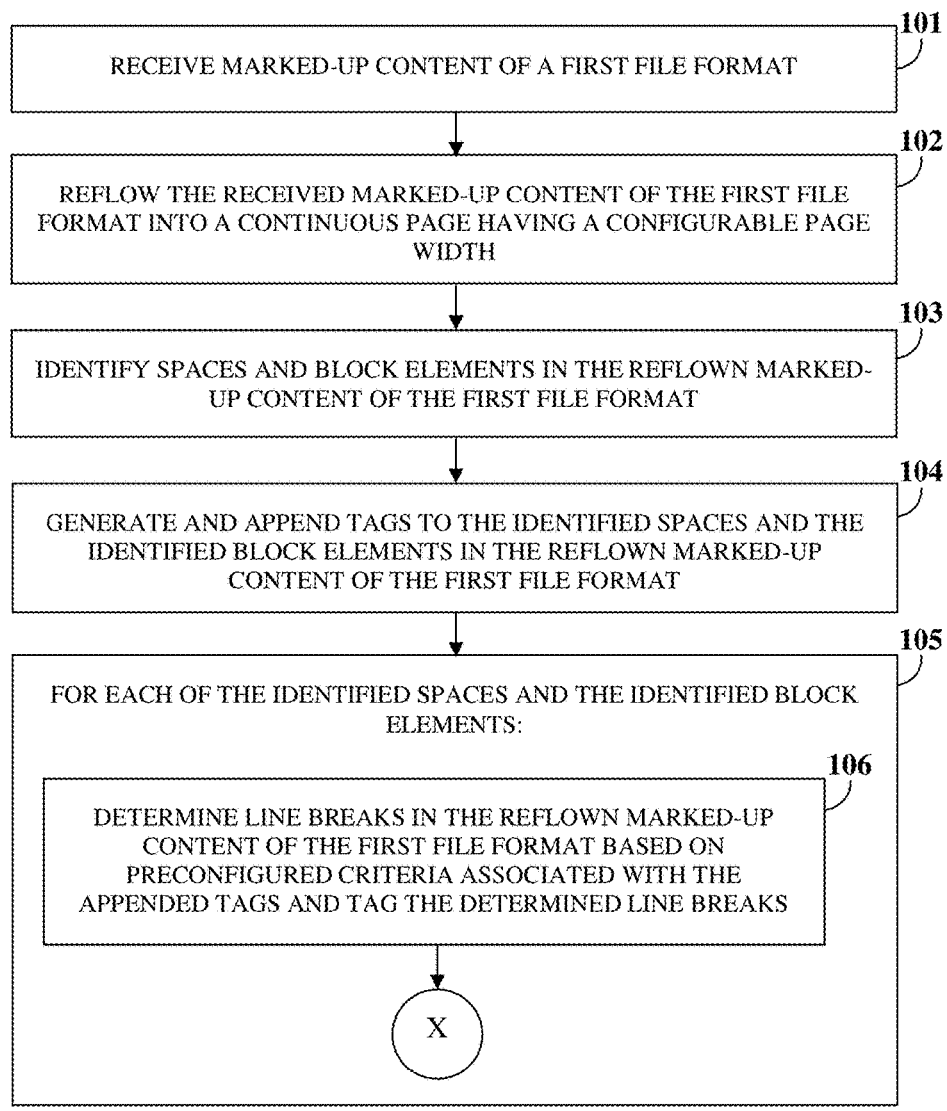
FIGS. 1A-1B illustrate a computer implemented method for transforming marked-up content in a first file format to a reversible second file format.
Figure 1B:
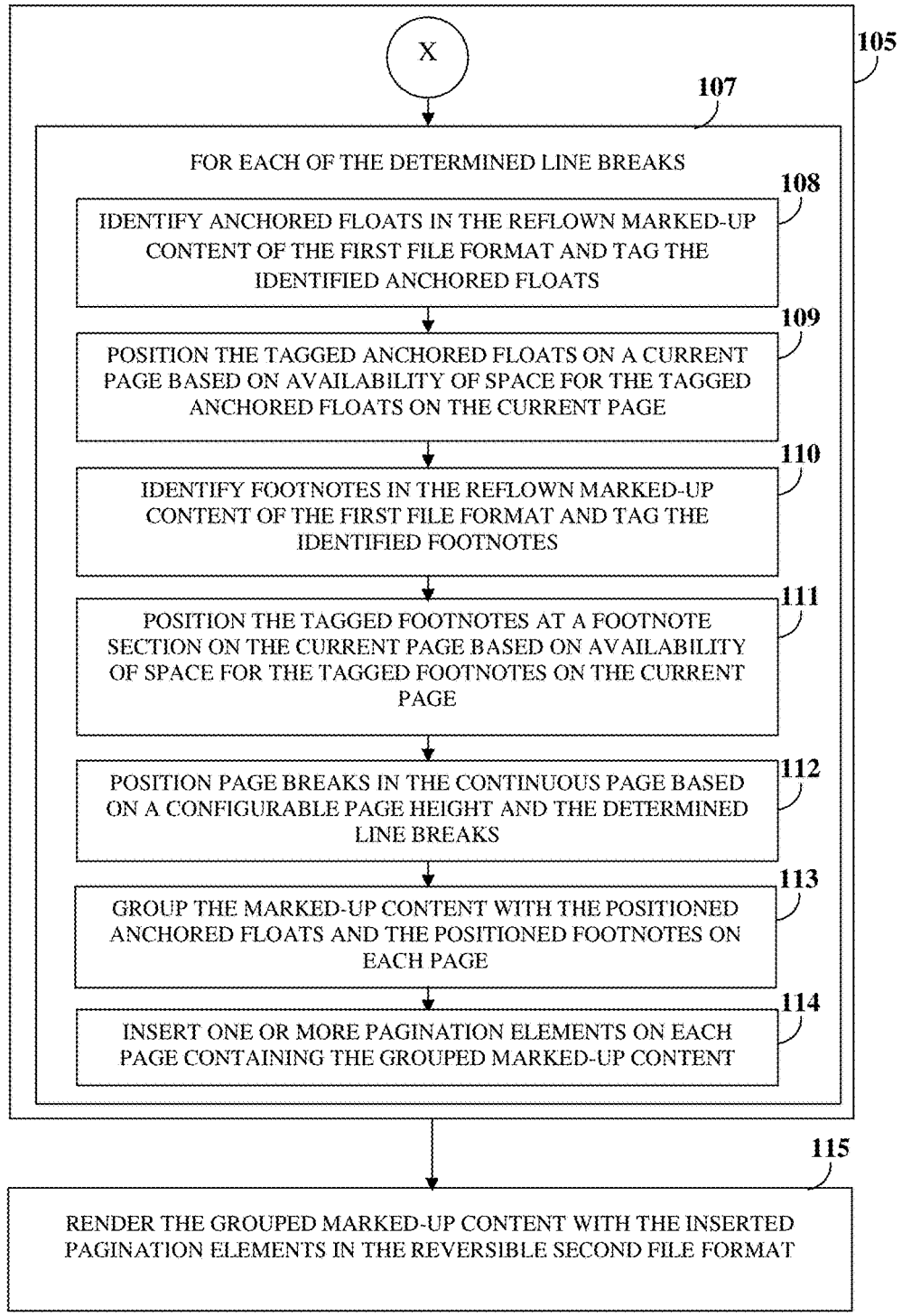

FIGS. 1A-1B illustrate a computer implemented method for transforming marked-up content in a first file format to a reversible second file format, hereafter referred to as a "reversible file format". As used herein, "marked-up content" refers to content having markups or appended tags that indicate the type of content, for example, a header, a footer, a caption, a table, a figure, an image, a video, a line break, etc. As used herein, "line break" refers to a pagination element representing the end of a line of text. Also, as used herein, "reversible file format" refers to a file format that can be back transformed into the first file format. The reversible file format disclosed herein is named, for example, as "PH5" that represents pagination with hypertext markup language 5 (HTML5) and comprises a set of properties including tags that are generated in accordance with structural semantics of documents in the first file format, for example, hypertext markup language (HTML) documents, and recognizes scripts that shape the PH5 output. The scripts that shape the PH5 output vary.

The computer implemented method disclosed herein employs a file format transformation system (FFTS) deployed on a client device comprising at least one processor configured to execute computer program instructions for transforming marked-up content in a first file format to a reversible second file format. The client device is a computing device, for example, a personal computer, a tablet computing device, a mobile computer, a mobile phone, a smart phone, etc. The FFTS converts web content seamlessly using document tagging. The file format transformation system (FFTS) receives 101 marked-up content of a first file format, for example, a hypertext markup language (HTML), an extensible hypertext markup language format (XHTML), etc. The FFTS receives document contents, for example, in the HTML format. In an embodiment, the first file format is an extensible markup language (XML). In this embodiment, the FFTS converts a document from the XML format to an HTML format and then transforms the mark-up content in the HTML format to the reversible file format. A browser that loads the marked-up content of the first file format inserts code points, for example, soft hyphens in the marked-up content of the first file format based on dictionary elements, for example, dictionary syllables such as—im-por-tant, con-se-quence, ap-pear-ance, etc. As used herein, a "soft hyphen" refers to a code point reserved in coded character sets used for breaking words across lines by inserting visible hyphens. Unicode defines the soft hyphens as invisible characters that allow a manual specification of a position where a hyphenated break is allowed without forcing a line break in an inconvenient place if the content or text is later reflowed. The FFTS reflows 102 the received marked-up content of the first file format into a continuous page having a configurable page width. As used herein, the term "reflow" refers to a browser process of recalculating positions of HTML elements in the HTML content and re-rendering the HTML elements with new positions.

The file format transformation system (FFTS) identifies 103 spaces and block elements in the reflown marked-up content of the first file format. In an embodiment, the FFTS identifies existing break elements, for example, hard breaks such as soft hyphen breaks, line breaks, and para breaks in the reflown marked-up content of the first file format. The FFTS also identifies unanchored or uncited floats in the reflown marked-up content of the first file format. The block elements are content elements that create blocks or large groupings of content and generally begin new lines of text. The block elements expand to fill a parent container containing text, inline elements, etc., and can have margins and/or padding, fitting the child elements. The <div> element is a block element in the hypertext markup language (HTML). The block elements, for example, (<div>, <h1>-<h6>, <p>) in a document start on a new line and take up the full width available. The FFTS generates and appends 104 tags to the identified spaces and the identified block elements in the reflown marked-up content of the first file format. The FFTS generates tags in accordance with structural semantics of the marked-up content, which then helps the scripts recognize the tags. The FFTS replaces the identified word spaces, for example, with <span data-PH5=WS>, where the term "span" is a tag used to group inline elements, for example, <a>, <img>, etc., in the HTML that do not start on a new line and only take up a necessary width. As used herein, "word space" refers to a single space between two words. The FFTS tags the identified block elements, for example, as <div class WSP>, where "WSP" refers to para break. In an embodiment, floats and footnotes have prior representation in an input document of the first file format, for example, the HTML format and need no specific tagging. As used herein, "floats" refer, for example, to images, videos, audio content, tables, figures, etc., that float unhinged from the main content flow, except in their relationship to their citations as available in the input document. Also, as used herein, the term "footnotes" refers to content that is intended to be placed at the bottom of a page and used to cite references to content on the page. Image floats have, for example, <img> tags. Table floats can be recognized by the presence of various tag elements, for example, <td>, <tr>, etc. Footnotes are in a number series and are shown as superscript <sup> numbers that are assigned to specific locations in the main content flow, and these superscripts reference notes appended to the main content, for example, at the bottom in a continuous page.

Figure 3A:
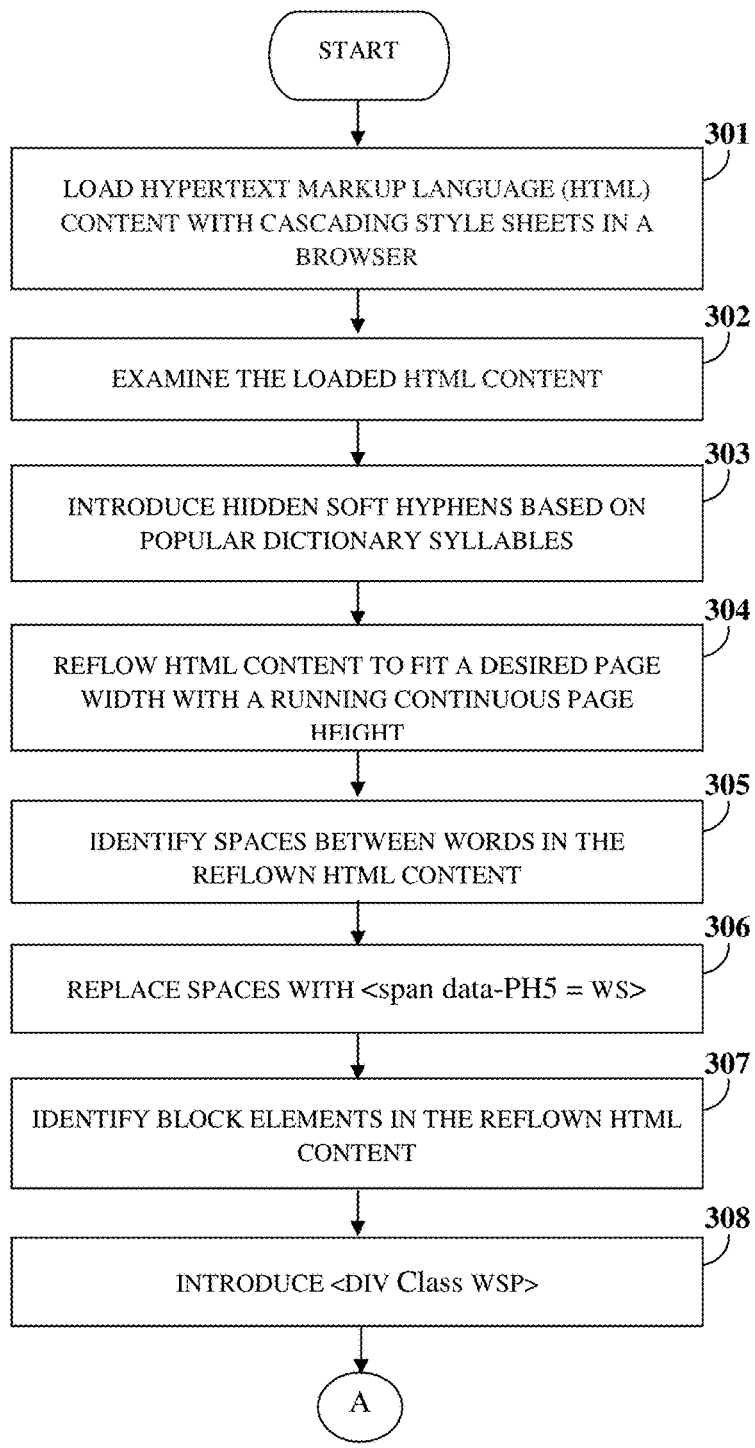
FIGS. 3A-3F exemplarily illustrate a flowchart comprising the steps performed by a file format transformation system for transforming marked-up content in a first file format to a reversible second file format.
Figure 3B:
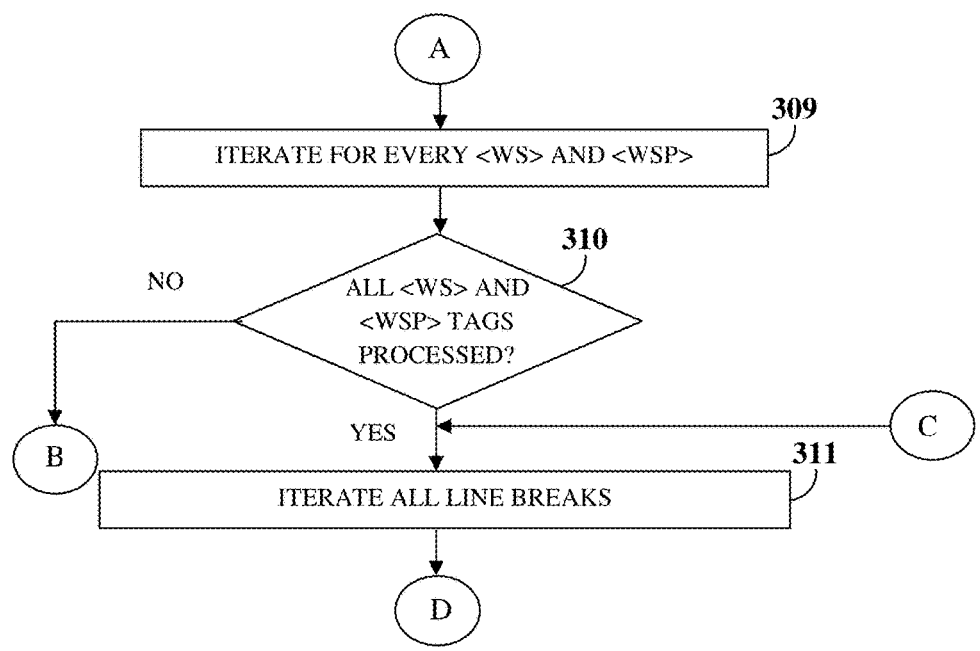
Figure 3C:
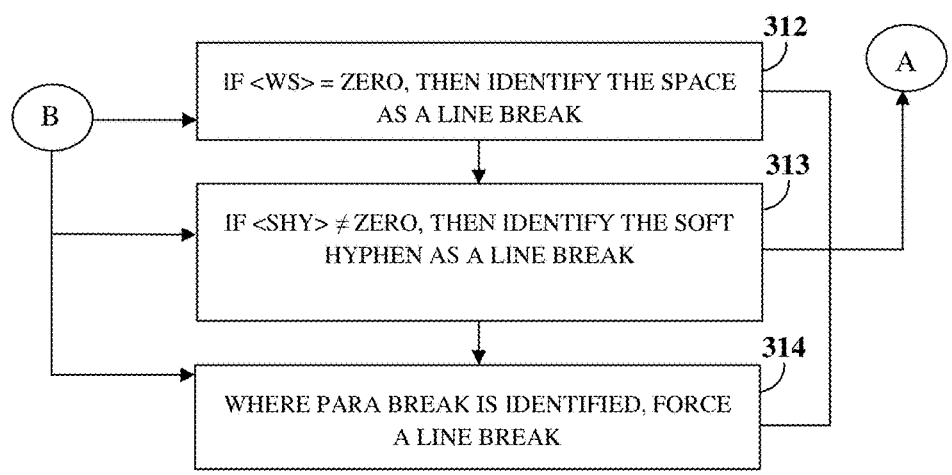

For each of the identified spaces and the identified block elements 105, the file format transformation system (FFTS) determines 106 line breaks in the reflown marked-up content of the first file format based on preconfigured criteria associated with the appended tags exemplarily illustrated in FIG. 3C, and tags the determined line breaks. The line breaks retain integrity of the reversible second file format by hyphenating and adjusting spaces in the marked-up content rendered in the reversible file format. In an embodiment, the FFTS identifies the line breaks through JavaScript® developed by Sun Microsystems, Inc.

For each of the determined line breaks 107, the file format transformation system (FFTS) identifies 108 anchored floats in the reflown marked-up content of the first file format and tags the identified anchored floats. The FFTS positions 109 the tagged anchored floats on a current page based on availability of space for the identified anchored floats on the current page. The FFTS positions the tagged anchored floats proximal to associated float citations on the current page based on availability of space for the tagged anchored floats on the current page. The FFTS identifies 110 footnotes in the reflown marked-up content of the first file format and tags the identified footnotes. The FFTS places the footnotes initially as "line notes" immediately below the cited line, works out the available space after flowing the main text, and then reflows the footnote to the bottom of the same page. The FFTS positions 111 the tagged footnotes at a footnote section on the current page based on availability of space for the tagged footnotes on the current page. The FFTS positions the tagged footnotes proximal to associated footnote citations on the current page based on availability of space for the tagged footnotes on the current page. The FFTS positions page breaks 112 in the continuous page based on a configurable page height and the determined line breaks for the positioning of the tagged anchored floats and the tagged footnotes on a subsequent page on non-availability of space on the current page. As used herein, "page break" refers to a marker that indicates that content which follows the marker is part of a new page. The FFTS groups 113 the marked-up content with the positioned anchored floats and the positioned footnotes on each page. The FFTS inserts 114 one or more of multiple pagination elements, for example, page numbers, a header, a footer, a footnote ruler, fillers, etc., on each page containing the grouped marked-up content.

The FFTS tags the identified word spaces, for example, as <span data-ph5="ws">. The FFTS tags the line breaks, for example, as <span data-ph5="wsbr">. The FFTS represents the lines ending with hyphenations, for example, as <span data-ph5="wshbr">. At the end of every paragraph in the reflown marked-up content, the file format transformation system (FFTS) introduces a paragraph break. As used herein, "paragraph break" refers to a pagination element representing the end of a paragraph. The paragraph break is a non-intrusive data model that preserves an original data model of the hypertext markup language (HTML). The FFTS represents the paragraphs, for example, as <p>, <div>, etc., and appends appropriate tags, for example, <div data-ph5="wsp"> to the paragraphs. The FFTS tags the paragraph breaks, for example, as <div data-ph5="wsp">.

The file format transformation system (FFTS) positions the floats, for example, figures, tables, text boxes, etc., closer to anchors within the available space. Where anchors are not available, the FFTS appends anchors at the input location of the float. The FFTS represents the floats, for example, as <div data-ph5="float"> with a relevant identifier (id) attribute. The corresponding anchors are represented as <span data-ph5="float-anchor"> with a "refid" attribute matching the "id" attribute value of the corresponding float. The FFTS initially positions the floats near their anchors and then moves the floats to the bottom or top of the current page, or to one of the following pages according to the availability of space similar to footnotes. The FFTS positions floats, for example, images, tables, text boxes, pull-outs, etc., in proximity to the anchor and ensures that grouped elements such as captions for the floats, if any, appear immediately before or after the floats, and that the captions are not widowed or orphaned. The FFTS handles the grouped elements comprising, for example, a float and a caption associated with the float in the reversible file format at a position assigned in the marked-up content of the first file format to the float.

The file format transformation system (FFTS) declares uniform resource locater (URL) breaks to a paging engine. The FFTS couples expressions such as footnotes to page breaks. The page break breaks a web page into a predefined length and delivers cut pages, while ensuring headings and words at the beginning and end paragraphs are not widowed or orphaned. The FFTS introduces page breaks when a script cookie cuts the fluid page to a reference dimension. The FFTS introduces a page break tag, for example, <div data-ph5="wspbr"> to the appropriate line break. The FFTS initially positions footnotes next to the corresponding citations. The FFTS moves the footnotes to the footer section of the page after introduction of the page breaks. The FFTS tags the footnotes, for example, as <div data-ph5="footnote">, where the first footnote comprises an additional class called "firstFootnote" and the rest of the footnotes comprise an additional class called "notFirstFootnote". The FFTS numbers the footnotes and positions the footnotes at the bottom of the relevant page.

The file format transformation system (FFTS) inserts page numbers, a header, a footer, a footnote ruler, fillers, etc., or any combination thereof in one or more pages in the reversible second file format. The FFTS inserts page number tags, for example, <div data-ph5="page-number"> in the line breaks. The FFTS inserts page numbers on the pages based on a predefined numbering style. The FFTS inserts the footnote ruler, for example, as a horizontal line to separate running text and the footnotes. The FFTS tags the footnote ruler, for example, as <div data-ph5="footNoteRuler">. The FFTS allows the footnote ruler to be tweaked on and off in the cut pages. For fixed page rendering, the FFTS uses filler compensation for eliminating orphans, widows, and divorce between couples, for example, section heading and paragraph, figure and table, table heading and table, etc. The FFTS represents the fillers, for example, as <span data-ph5="fillerText">. The FFTS automatically deploys fillers, for example, line spaces, if needed, to fill to a page to increase aesthetics.

The file format transformation system (FFTS) renders 115 the grouped marked-up content with the inserted pagination elements in the reversible file format. The FFTS compiles and positions the reflown marked-up content and the pagination elements with associated properties at predetermined context based positions across multiple pages based on page dimensions and the appended tags. The FFTS performs hyphenation and justification in the rendered marked-up content in the reversible second file format to provide kerning based on aesthetics, for example, for avoidance of loose lines and blank rivers. The reversible second file format allows the marked-up content to be reversed to the first file format to restore the continuous page. The rendered marked-up content in the reversible second file format is accessible on one or more multiple browsers on multiple operating systems. The fixed page in the reversible file format to which the marked-up content in the first file format is transformed is expressed, for example, as a pixel dimension equivalent of a paper size or a device size. The data model of the reversible file format, for example, referred to as the PH5 format transforms a fluid page, for example, in a hypertext markup language (HTML) format to a fixed page, for example, in the reversible file format or the PH5 format, where the transformation is reversible. That is, the FFTS interprets a fluid page and delivers a fixed page. The tagged input allows the transformation of a fluid page to a fixed page. The enriched inheritance comprises page breaks. The other elements are defined in terms of the page breaks. The extension of the fixed page in the PH5 format is, for example, .PH5. The FFTS bridges fluid web-content and fixed-page typesetting, originating as a fluid HTML, without a reference printer at the destination. The PH5 format is similar, for example, to a zip file format such as an electronic publication (ePub) format and can be opened in a common browser on any operating system in a fixed page view. A PH5 file can be back-transformed into a standard hypertext markup language (HTML) file from which the PH5 file was generated with the fluidity of the HTML file restored.

In the PH5 data model, the file format transformation system (FFTS) performs document intelligence tagging. Tagging the spaces or blanks effects visible content for emulation and standardization. In the PH5 file format, line break candidates are identified and marked up as page breaks. With this method, implicit statements in the document are understood and tagged for downstream machine reading or paging. The transformation from a fluid file format to the reversible file format, that is, the PH5 file format is accomplished subject to the availability of a tag set that exposes an understanding of document semantics to scripts that generate the PH5 package. Creation of the tag set allows creation of a fixed page view that captures document elements that are expressed relationally and that are then assigned page-and-context-appropriate placement and styling. A PH5 file, as a portable document, anticipates the tag set in a work queue and defines a standard for creating the same. The PH5 files do not need reference printers, driver installations, configuration of printer settings, etc., and also do not need a reader application or a browser plug-in. Furthermore, the PH5 files allow offline storage of information.

Figure 2:
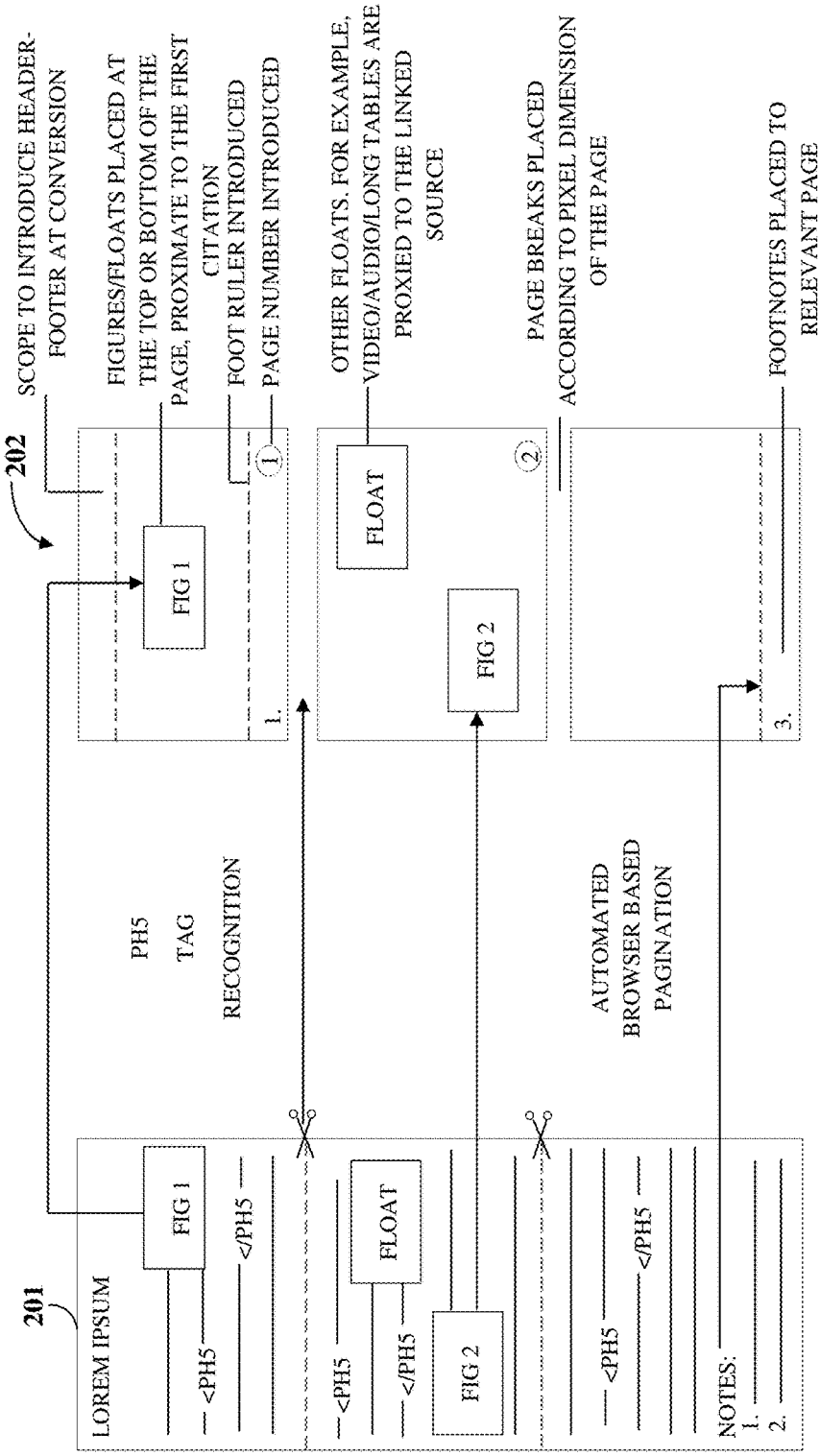
FIG. 2 exemplarily illustrates an interpretation of marked-up content in a reversible second file format.

FIG. 2 exemplarily illustrates an interpretation of marked-up content in a reversible second file format, herein referred to as a PH5 format. A typical HTML page does not have tags specified for spaces. The HTML page comprises a header, a footer, footnotes, floats such as figures, tables, images, video, audio, etc. The file format transformation system (FFTS) loads a hypertext markup language (HTML) page with associated cascading style sheets and transforms the HTML page to a PH5 page 201 of the PH5 format as exemplarily illustrated in FIG. 2. During the transformation, the FFTS identifies word spaces and block elements in the HTML page and appends the identified word spaces and the identified block elements with appropriate PH5 format tags. For example, the FFTS tags each word space with a tag <span data-ph5="ws"> and appends a tag <div data-ph5="wsp"> at the end of every paragraph. The FFTS identifies line breaks using JavaScript® and tags the identified line breaks, for example, with a tag <span data-ph5="wsbr">. Further, the FFTS tags the line breaks that end with a hyphen, for example, with a tag <span data-ph5="wshbr">. The FFTS system performs tagging without replacing the original HTML tags, thereby preserving the original HTML tags to allow the final output reversible file format to be reverted back into HTML page, if a user wants to suppress the changes and revert back to the HTML page. The tagged HTML page, that is, the PH5 page 201 exemplarily illustrated in FIG. 2, contains all the content of the original input HTML page along with the PH5 format tags. The tagging process allows the FFTS to transform a fluid HTML page into fixed HTML pages. A fluid HTML page contains responsive content elements that resize their position and geometry according to a web browser width.

The file format transformation system (FFTS) further introduces a page break tag <div data-ph5="wspbr"> next to an appropriate line break with reference to dimensions of the page. The FFTS inserts a page number tag <div data-ph5="page-number"> at the bottom of the page. The FFTS positions any available footnotes proximate to a respective citation and once the page breaks are introduced, the FFTS tags the footnotes <div data-ph5="footnote"> and positions the footnotes at the bottom of the page. The FFTS places an additional class tag after the first footnote "firstFootnote" and tags the following footnotes with an additional tag "notFirstFootnote" to differentiate between the first footnote and the following footnotes. The FFTS system introduces a horizontal line to separate the main content from the footnote matter and tags the horizontal line as <div data-ph5="footNoteRuler">. The FFTS tags floats, for example, "FIG. 1" and "FIG. 2" exemplarily illustrated in FIG. 2, as <div data-ph5="float"> with a relevant "id" attribute and tags corresponding anchors as <span data-ph5="float-anchor"> with a "refid" attribute matching the "id" attribute value of the corresponding float. The FFTS renders the PH5 page 201 with the PH5 tags disclosed above. The FFTS creates headers and footers using auto-generated content wrapped in <div data-ph5="page-header"> and <div data-ph5="page-footer"> respectively, with sub-elements for left, right, or center positioning.

The file format transformation system (FFTS) performs PH5 tag recognition for automated browser based pagination and generates output pages 202. The FFTS recognizes the PH5 format tags appended in the PH5 tagged hypertext markup language (HTML) page 201. As exemplarily illustrated in FIG. 2, the PH5 tagged HTML page 201 comprises two figures labeled as "FIG. 1" and "FIG. 2" along with another float. During the tag recognition process, the FFTS encounters the float tag of the first float, that is, FIG. 1, in the PH5 tagged HTML page 201 and positions "FIG. 1" proximal to the corresponding citation until the FFTS encounters a page break tag. When a page break tag is encountered based on the availability of space, the FFTS positions the float "FIG. 1" at the top or bottom of the page close to the respective citation. The FFTS then allows the reflow of the HTML content to fit in the specified page width. The FFTS, upon recognizing, the footnote tag introduces the footnote matter at the bottom of the page in close proximity to the respective citation. The FFTS introduces a footnote ruler to separate the main content from the footnote matter upon recognition of the footnote tag. The FFTS further encounters a page number tag and introduces a page number at the bottom of the page after the footnote matter. The FFTS then breaks the page into an individual page after encountering the page break tag which is placed based on the reference page height.

The file format transformation system (FFTS) then proceeds to the next section after the page break tag, proxies "FIG. 2" and other floats, for example, audio, video, tables, etc., to a linked source, positions these floats according to the availability of space, positions page breaks according to the pixel dimension of the page, and inserts a page number for the current page. The FFTS then proceeds to the next section after the page break tag, positions the remaining footnotes on the next page, and inserts a page number for the next page. The FFTS performs the page transformation process until the last page break tag is recognized.

FIGS. 3A-3F exemplarily illustrate a flowchart comprising the steps performed by the file format transformation system (FFTS) for transforming marked-up content in a first file format, for example, a hypertext markup language (HTML) format to a reversible second file format, hereafter referred to as a "reversible file format". As exemplarily illustrated in FIG. 3A, the FFTS loads 301 the HTML content with cascading styling sheets (CSS) in a browser and examines 302 the loaded HTML content. The FFTS analyzes and describes syntactic roles of the HTML content. The FFTS introduces 303 hidden code points, for example, soft hyphens into the HTML content based on popular dictionary elements, for example, dictionary syllables. The FFTS then reflows 304 the HTML content to fit a desired page width with a running continuous page height. The reflow process is used in a markup language document to render the markup language document to different types of user devices. The FFTS identifies 305 spaces between words in the reflown HTML content and replaces 306 each of the spaces with a tag, for example, <span data-PH5=WS> tag, where "WS" refers to word space. The FFTS performs word spacing according to a kerning of a selected font. The FFTS also identifies 307 block elements in the reflown HTML content and introduces 308 a tag, for example, a <div class WSP> tag for each of the identified block elements in the reflown HTML content, where "WSP" refers to word space paragraph. As used herein, the term "<div>" refers to a markup language tag that defines a container for holding content elements.

After tagging, the file format transformation system (FFTS) iteratively processes the generated tags and identifies, for each of the identified spaces and the identified block elements, one or more pagination elements in the reflown HTML content. In this example, the FFTS identifies pagination elements such as line breaks, floats, and footnotes as exemplarily illustrated in FIGS. 3C-3E respectively.

FIG. 3B exemplarily illustrates iteration steps performed by the file format transformation system. The file format transformation system (FFTS) iterates 309 the steps of determining and assignment of line breaks for every occurrence of the <WS> tag and the <WSP> tag as exemplarily illustrated in FIG. 3C, until all the <WS> tags and the <WSP> tags are processed 310. The file format transformation system (FFTS), after processing all the <WS> and <WSP> tags, iterates 311 all the line breaks and then proceeds to the steps exemplarily illustrated in FIG. 3D-3E.

FIG. 3C exemplarily illustrates determination and assignment of line breaks at appropriate positions in the reversible file format. The FFTS determines and assigns line breaks upon encountering any one of the following conditions: If the word space <WS> equals zero, then the FFTS identifies 312 the word space as a line break; if a soft hyphen <SHY> is not equal to zero, then the FFTS identifies 313 the soft hyphen as a line break; and if the FFTS identifies a paragraph break, the FFTS forces 314 a line break. After assigning the line breaks, the FFTS iterates 311 all the line breaks as exemplarily illustrated in FIG. 3B.

Figure 3D:
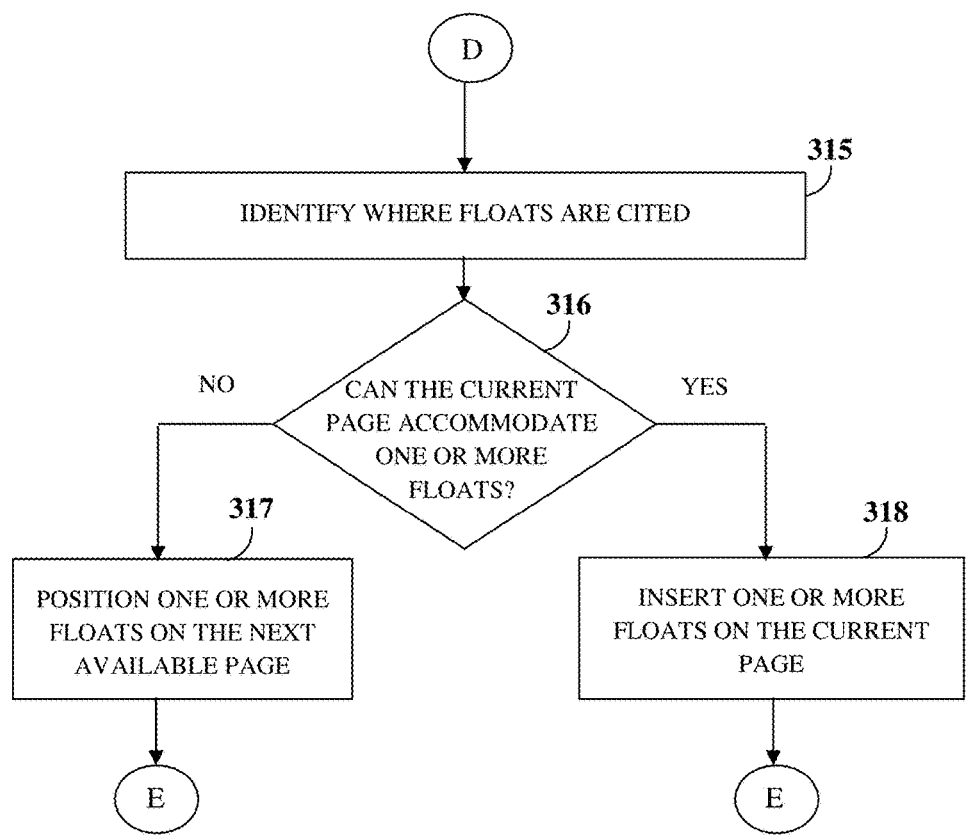

FIG. 3D exemplarily illustrates positioning of floats proximate to a first citation in the reflown HTML content. The file format transformation system (FFTS) identifies 315 where the floats are cited in the reflown HTML content and checks 316 whether a current page can accommodate one or more floats. If the current page cannot accommodate one or more floats, the FFTS positions 317 one or more floats into the next available page proximate to their respective citation. If the current page can accommodate one or more floats, the FFTS inserts 318 the floats on the current page. For example, for a page with 500 pixels of fixed height, the FFTS examines each line from top to bottom until the FFTS reaches the specified page height of 500 pixels, while keeping track of the pixels covered. If the FFTS encounters a float before the 500 pixel height, the FFTS analyzes the float pixel dimension and the pixels covered so far and determines the sum of the float pixel dimension and the pixels covered till the point where the float was cited. If the sum exceeds the specified page height, for example, 500 pixels, the FFTS inserts the float on the next available page after the page break, in a way that the float follows the citation but does not precede the citation, and if the sum of the float pixel dimension and the pixels covered till the point where the float was cited is less than the specified page height, then the float is inserted on the same page proximate to its citation. After positioning of the floats proximate to a first citation in the reflown HTML content, the FFTS proceeds to the steps exemplarily illustrated in FIG. 3F.

Figure 3E:
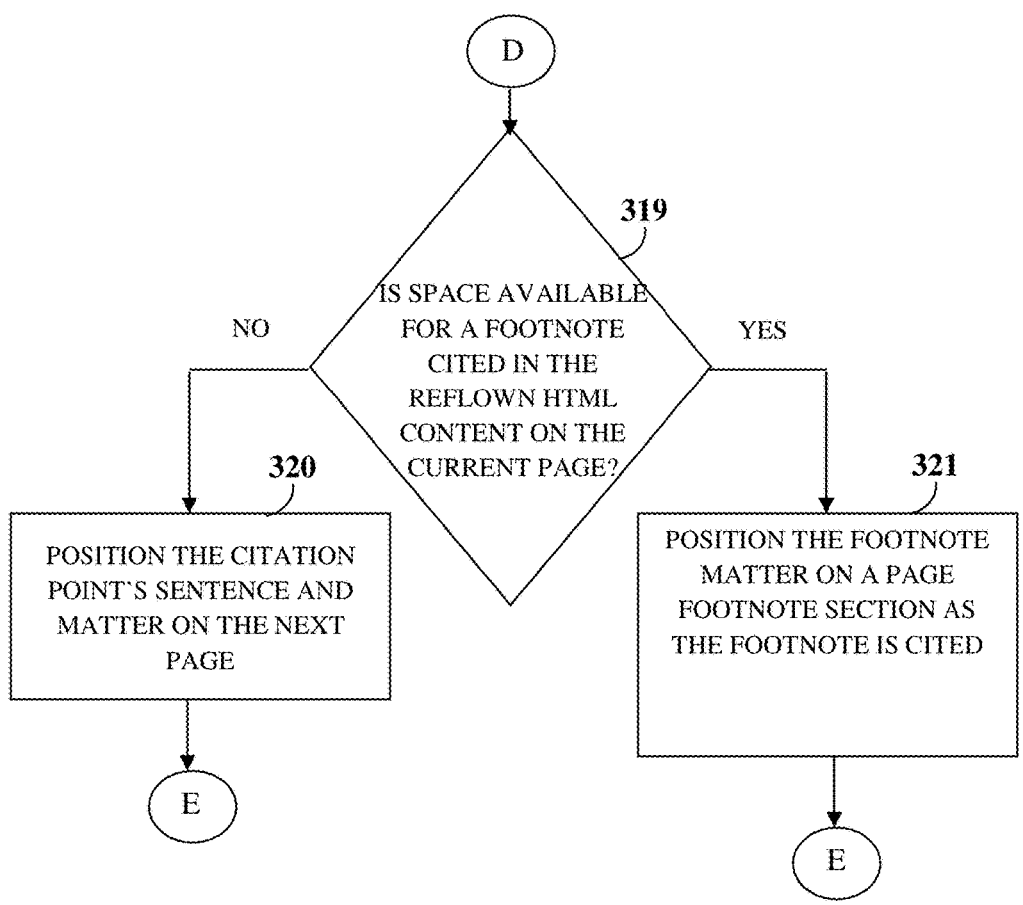

FIG. 3E exemplarily illustrates positioning of footnotes at relevant pages in the reversible file format. The file format transformation system (FFTS) identifies footnotes in the reflown hypertext markup language (HTML) content and checks 319 whether space is available for a footnote cited in the reflown HTML content. If space is not available in the current page, the FFTS positions 320 the footnote, that is, the citation point's sentence and matter, on the next page. If there is enough space available in the current page, the FFTS positions 321 the footnote matter on a page footnote section as the footnote is cited. For example, for a page with 500 pixels of fixed height, the FFTS examines each line from top to bottom until the FFTS reaches the specified page height of 500 pixels, keeping track of pixels covered. If the FFTS encounters a footnote citation before the 500 pixel height, the FFTS analyzes the corresponding footnote pixel dimensions and the pixels covered so far and determines the sum of the footnote pixel dimension and the pixels covered till the point where the footnote was cited. If the sum exceeds the specified page height, for example, 500 pixels, the FFTS accommodates the footnote along with its citation on the next available page after the page break, and if the sum of the footnote pixel dimension and the pixels covered till the point where the footnote was cited is less than the specified page height, then the footnote is accommodated proximate to its citation in the same page at the bottom. After positioning the footnotes at relevant pages in the reversible file format, the FFTS proceeds to the steps exemplarily illustrated in FIG. 3F.

Figure 3F:
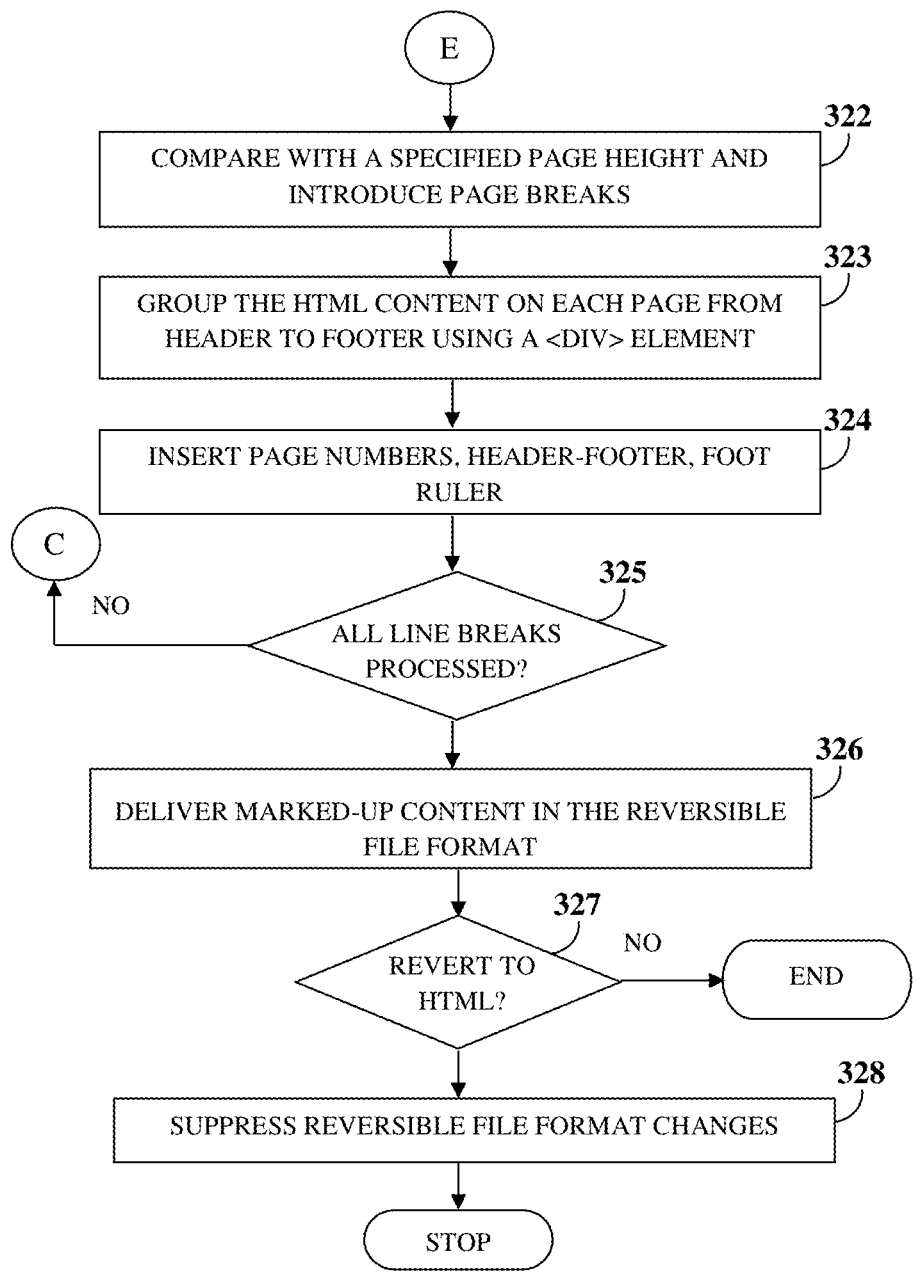

FIG. 3F exemplarily illustrates the rendering of the hypertext markup language (HTML) content in the reversible file format. The file format transformation system (FFTS) compares 322 the HTML content with a specified page height and introduces page breaks appropriately into the HTML content. The page breaks break the HTML content into individual pages of a predefined length. The FFTS groups 323 the HTML content on each page from header to footer using a <div> element. The FFTS inserts 324 page numbers into the individual pages based on a predefined numbering style, a header and footer, and places a footnote ruler wherever necessary. The FFTS checks 325 whether all the line breaks are processed. If all the line breaks are not processed, the FFTS iterates 311 all the line breaks as exemplarily illustrated in FIGS. 3B-3C. The FFTS then delivers 326 the marked-up content in the reversible file format. The FFTS provides an option to revert 327 the changes made in the reversible file format to the first file format, for example, the HTML file format. If a user wants to revert from the reversible file format to the HTML file format, the FFTS suppresses 328 the changes by hiding the changes in a background and displays the input HTML page having the input HTML content.

Figure 4A:
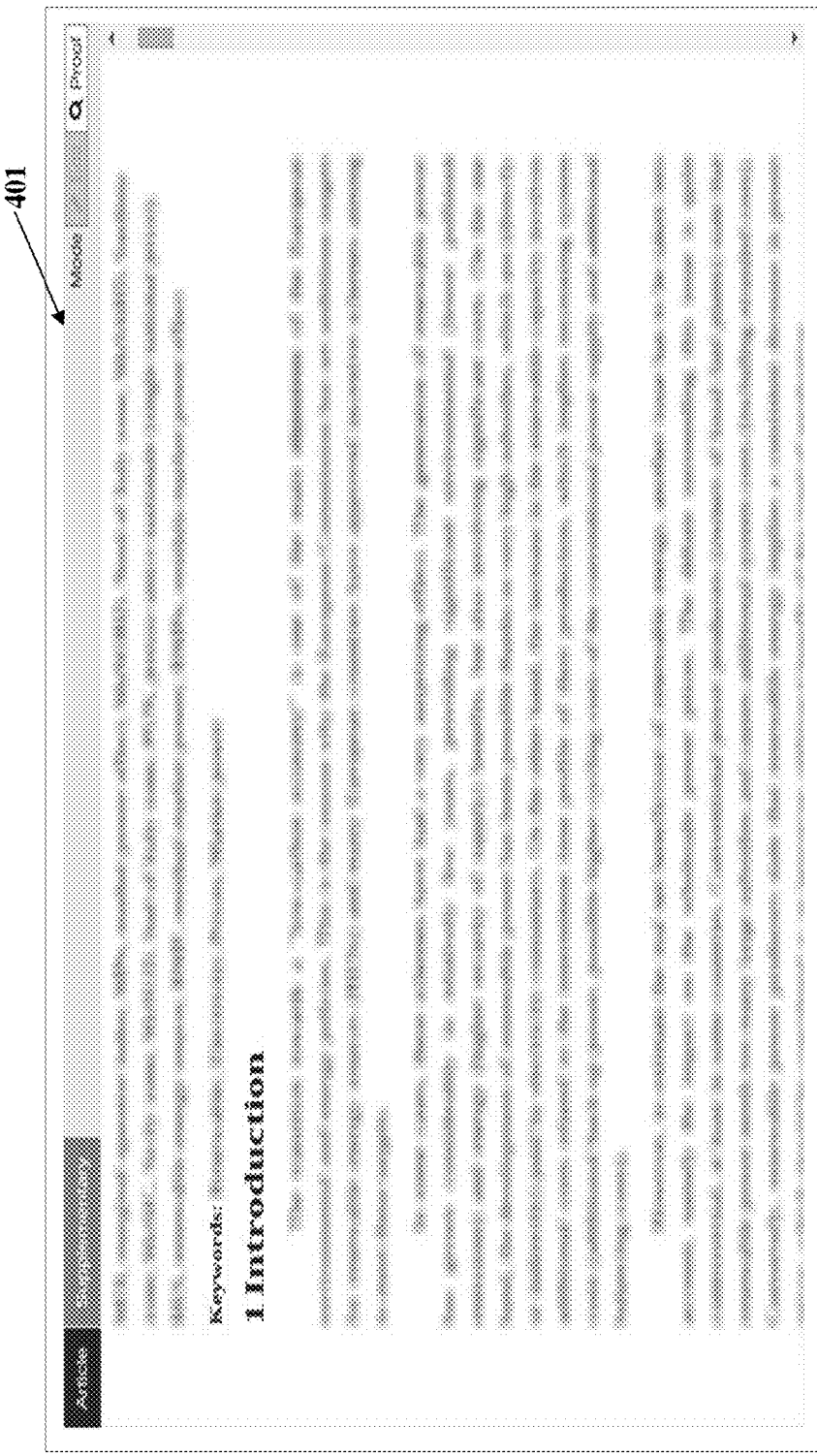
FIGS. 4A-4B exemplarily illustrate screenshots showing edit views of marked-up content.
Figure 4B:
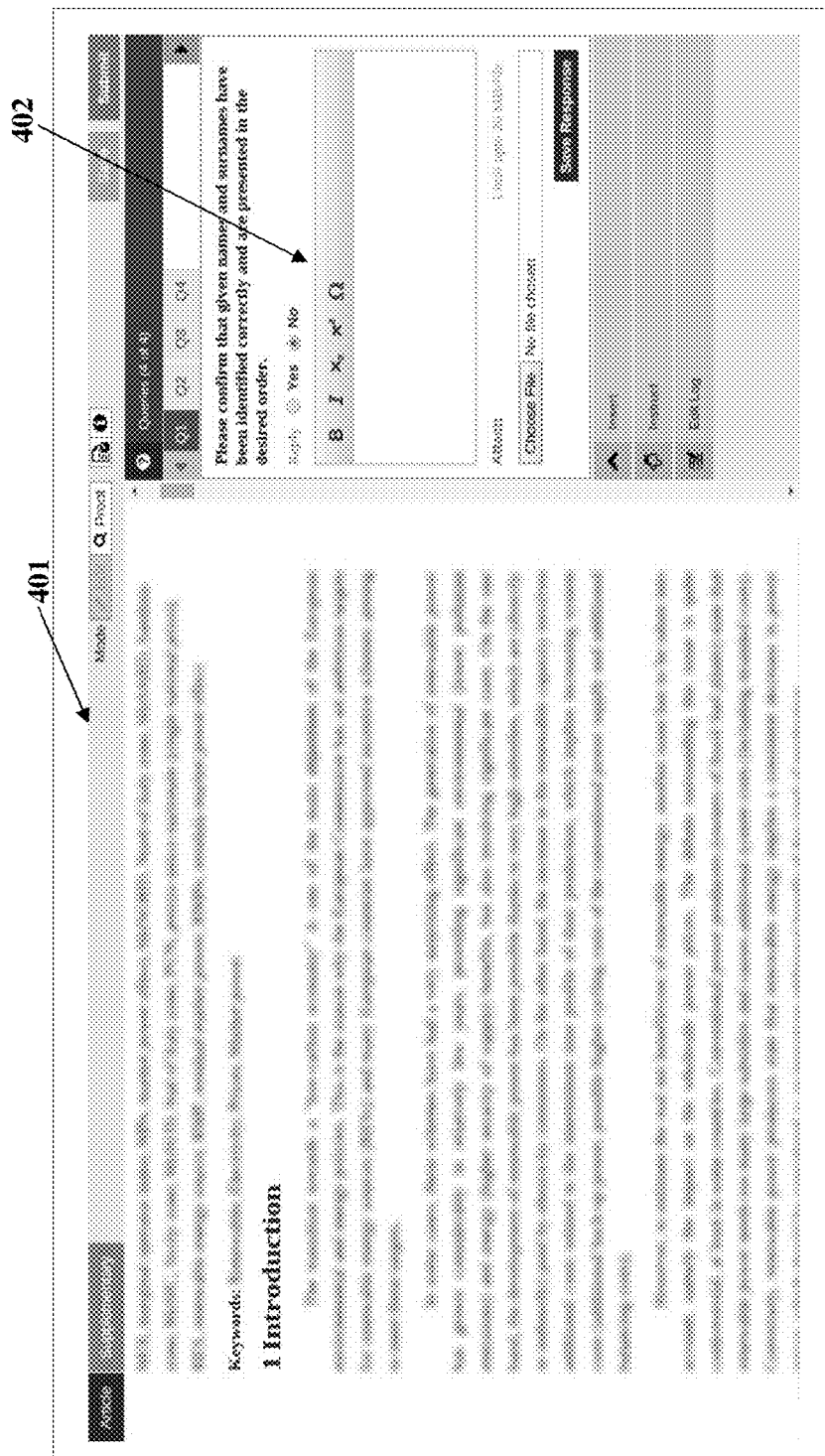

FIGS. 4A-4B exemplarily illustrate screenshots showing edit views of marked-up content. FIG. 4A exemplarily illustrates a screenshot of an input hypertext markup language (HTML) page containing marked-up content without an edit window 402 in a right pane of a graphical user interface (GUI) 401. FIG. 4B exemplarily illustrates a screenshot of the input HTML page containing marked-up content showing the edit window 402 in the right pane of the GUI 401. The source code of the input HTML page in the edit view is provided below:
<div class="ce_section" id="sec0005" name="OPT_ID_294"><div class="sectionline_opt" name="PC_5897104232" id="PC_5897104232"><span

1. Introduction

Neurotrophins are a family of growth factors that regulate neuronal survival, growth, and differentiation in the central nervous system [1]. Four identified neurotrophic factors including nerve growth factor, brain-derived neurotrophic factor (BDNF), neurotrophin-3, and neurotrophin-4 exert their effects through binding to two different receptors, the tropomyosin-related kinase (Trk) receptor and the p75 neurotrophin receptor. All proneurotrophins are capable of binding to the p75 receptor; however, three Trk receptors, TrkA, TrkB, and TrkC, bind only to mature NGF, BDNF or NT-4, and NT-3, respectively [2].

BDNF is the most abundant neurotrophin in the brain and is essential for synaptic plasticity involved in long-term potentiation (LTP) and learning and memory formation [3]. Hippocampus-specific BDNF gene knockout or knockdown in rodents results in cognitive impairment in behavioral tests [4,5]. Moreover, BDNF has neuroprotective effects against diverse neurotoxic insults and neurodegenerative disease models, including Alzheimer's disease (AD) [6,7].

AD is a common neurodegenerative disease characterized by progressive cognitive deficits, and the accumulation of aggregated amyloid-beta (A$\beta$) peptide and intracellular neurofibrillary tangles which are composed of hyperphosphorylated tau protein [8]. A$\beta$ peptide, a key mediator of AD pathology, is produced after sequential cleavage of the amyloid precursor protein by beta- and gamma-secretases and subsequent aggregation into amyloid fibrils, known to be a major component of senile plaques [9]. Aggregated A$\beta$ peptide including both oligomeric and fibrillar species induces neuronal cell death *in vitro* and *in vivo* [10].

Neuronal functions and their involvement in AD have drawn considerable attention to BDNF as a therapeutic target for AD treatment. However, recombinant BDNF itself has poor pharmacokinetic properties, such as a short *in vivo* half-life, low blood-brain barrier penetrability, and limited diffusion [11]. Thus, a variety of strategies for restoring endogenous BDNF levels and functions are currently under development, such as BDNF gene therapy, BDNF-releasing cell grafts, BDNF mimetics, and the use of small molecules that regulate endogenous BDNF levels [12]. Recently, Nagahara et al. have shown that BDNF gene delivery or direct BDNF infusion restores spatial learning and memory deficits in an AD mouse model and in aged rats, respectively [6].

In a previous study, we screened and identified a BDNF-modulating peptide (Neuropep-1, Met-Val-Val-Gly) by a positional scanning synthetic peptide combinatorial library (PS-SPCL). This novel peptide was found to protect neurons against A$\beta$-induced neuronal cell death and improves spatial learning and memory performance in naïve rats and a triple-transgenic AD mouse model [13,14]. In this study, we modified and synthesized novel peptides based on our previous PS-SPCL data to identify a BDNF-modulating peptide more potent than Neuropep-1, and examined its protective effects against A$\beta$-induced neuronal cell death. Among the identified BDNF-modulating peptides, Neuropep-4, which has aspartic acid substituted for valine at the second position of Neuropep-1, was found to be highly effective in inducing BDNF expression even at 100-fold lower concentrations in the SH<span class="pc_cpereplace" name="cpe_id_105"><span class="cpedel" name="cpe_id_105" name="OPT_ID_330"></span>-</span><span class="cpeins" name="cpe_id_105" name="OPT_ID_331"></span><span class="unicode-char">-</span></span></span>SY5Y cell line. In addition, Neuropep-4 regulated BDNF expression in rat primary cortical neurons and provided neurons with the strongest protection against oligomeric and fibrillar A<span class="unicode-char">β</span><span class="ce_inf" name="OPT_ID_332">1-42</span>-induced cell death through BDNF upregulation compared to other peptides. These findings suggest that this novel peptide, Neuropep-4, has therapeutic potential for the treatment of AD.</div></div>

Figure 4C:
FIG. 4C exemplarily illustrates a screenshot showing a proof view of the marked-up content rendered in a reversible second file format.

FIG. 4C exemplarily illustrates a screenshot of the input hypertext markup language (HTML) page containing marked-up content in a proof view. The source code of the input HTML page in the proof view is provided below:

```
<div class="wrapper-page clearfix"><div class="page clearfix" style="height: 990px; position: relative;"><div class="page-header"><div class="left-header page-logo"><img src="http://s3.amazonaws.com/pgc-dev-test/cover_images/elsevier/HLY/HLY_Thumbnail.png"></div><div class="right-header"><span class="article-no">Article No ~ </span></div></div><div class="content top-space-none"><div class="head top-space-none" id="head1" name="OPT_ID_161"><div class="ce_abstract top-space-none" id="abs0010" name="OPT_ID_256"><div class="ce_abstract-sec top-space-none" id="abst0010" name="OPT_ID_258"><span class="ce_simple-para top-space-none" id="spar0025" name="OPT_ID_259">va-line<span class="ws"></span>in<span class="ws"></span>the<span class="ws"></span>sec-ond<span class="ws"></span>po-si-tion<span class="ws"></span>with<span class="ws"></span>as-par-tic<span class="ws"></span>acid,<span class="ws"></span>the<span class="ws"></span>re-sult-ing<span class="ws"></span>Neu-ropep-4<span class="ws"></span>was<span class="wsbr"></span>found<span class="ws"></span>to<span class="ws"></span>be<span class="ws"></span>highly<span class="ws"></span>ef-fec-tive<span class="ws"></span>in<span class="ws"></span>in-duc-ing<span class="ws"></span>BDNF<span class="ws"></span>ex-pres-sion<span class="ws"></span>even<span class="ws"></span>at<span class="ws"></span>con-cen-tra-tions<span class="wsbr"></span>of<span class="ws"></span>1<span class="ce_hsp" name="OPT_ID_275"> </span>pM<span class="ws"></span>in<span class="ws"></span>the<span class="ws"></span>SH<span class="pc_cpereplace" name="cpe_id_89"><span class="cpedel hideme" name="cpe_id_89" name="OPT_ID_276"></span>-</span><span class="cpeins" name="cpe_id_89" name="OPT_ID_277"></span><span class="unicode-char">-</span></span></span>SY5Y<span class="ws"></span>cell<span class="ws"></span>line<span class="ws"></span>and<span class="ws"></span>rat<span class="ws"></span>pri-mary<span class="ws"></span>cor-ti-cal<span class="ws"></span>neu-rons.<span class="ws"></span>In<span class="wsbr"></span>ad-di-tion,<span class="ws"></span>the<span class="ws"></span>among<span class="ws"></span>tested<span class="ws"></span>pep-tides,<span class="ws"></span>Neu-ropep-4<span class="ws"></span>pro-vided<span class="ws"></span>neu-rons<span class="ws"></span>with<span class="ws"></span>the<span class="ws"></span>strongest<span class="wshbr"></span>pro-tec-tion<span class="ws"></span>against<span class="ws"></span>oligomeric<span class="ws"></span>and/or<span class="ws"></span>fib-ril-lar<span class="ws"></span>A<span class="unicode-char">4</span><span class="ce_inf" name="OPT_ID_278">1-42</span>-in-duced<span class="ws"></span>cell<span class="ws"></span>death<span class="ws"></span>through<span class="ws"></span>BDNF<span class="wsbr"></span>up-reg-u-la-tion.<span class="ws"></span>These<span class="ws"></span>re-sults<span class="ws"></span>sug-gest<span class="ws"></span>the<span class="ws"></span>po-ten-tial<span class="ws"></span>of<span class="ws"></span>Neu-ro-pep-4<span class="ws"></span>as<span class="ws"></span>a<span class="ws"></span>ther-a-peu-tic<span class="wsbr"></span>can-di-date<span class="ws"></span>for<span class="ws"></span>treat-ing<span class="ws"></span>neu-rode-gen-er-a-tive<span class="ws"></span>dis-eases<span class="cpeins" name="cpe_id_91"><span name="OPT_ID_279"></span>,</span><span class="ws"></span>such<span class="ws"></span>as<span class="ws last-word"></span>AD.</div><div class="wsp"></div></div><div class="ce_keywords" name="OPT_ID_280" id="OPT_ID_280"><span class="ce_section-title" name="OPT_ID_281">Keywords<span class="x">: </span></span><span class="ce_keyword" name="OPT_ID_282"><span class="ce_text" name="OPT_ID_283">Brain-de-rived<span class="ws"></span>neu-rotrophic<span class="ws"></span>fac-tor</span><span class="x">; </span></span><span><span class="ce_keyword" name="OPT_ID_284"><span class="ce_text" name="OPT_ID_285">Alzheimer<span class="unicode-char">'</span>s<span class="ws last-word"></span>disease</span><span class="x">; </span></span><span><span class="ce_keyword" name="OPT_ID_286"><span class="ce_text" name="OPT_ID_287">Amy-loid-beta</span><span class="x">; </span></span><span class="ce_keyword" name="OPT_ID_288"><span class="ce_text" name="OPT_ID_289">Neu-ro-pro-tec-tion</span><span class="x">; </span></span><span class="ce_keyword" name="OPT_ID_290"><span class="ce_text" name="OPT_ID_291">Pep-tide</span></span><div class="wsp"></div></div></div><div class="ce_sections" name="OPT_ID_293" id="OPT_ID_293"><div class="ce_section" id="sec0005" name="OPT_ID_294"><div class="sectionline_opt first_level_heading" name="PC_5897104232" id="PC_5897104232"><span class="ce_label" name="OPT_ID_295">1</span><span class="x"> </span><span class="ce_section-title" name="OPT_ID_296">Introduction</span></div><div class="ce_para" id="par0020" name="OPT_ID_297">Neu-rotrophins<span class="ws"></span>are<span class="ws"></span>a<span class="ws"></span>fam-ily<span class="ws"></span>of<span class="ws"></span>growth<span class="ws"></span>fac-tors<span class="ws"></span>that<span class="ws"></span>reg-u-late<span class="ws"></span>neu-ronal<span class="ws"></span>
``` survival, growth, and differentiation in the central nervous system [1]. Four identified neurotrophic factors including nerve growth factor, brain-derived neurotrophic factor (BDNF), neurotrophin-3, and neurotrophin-4 exert their effects through binding to two different receptors, the tropomyosin-related kinase (Trk) receptor and the p75 neurotrophin receptor. All proneurotrophins are capable of binding to the p75 receptor; however, three Trk receptors, TrkA, TrkB, and TrkC, bind only to mature NGF, BDNF or NT-4, and NT-3, respectively [2].

BDNF is the most abundant neurotrophin in the brain and is essential for synaptic plasticity involved in long-term potentiation (LTP) and learning and memory formation [3]. Hippocampus-specific BDNF gene knock-out or knock-down in rodents results in cognitive impairment in behavioral tests [4,5]. Moreover, BDNF has neuroprotective effects against diverse neurotoxic insults and neurodegenerative disease models, including Alzheimer's disease (AD) [6,7].

AD is a common neurodegenerative disease characterized by progressive cognitive deficits and the accumulation of aggregated amyloid-beta (Aβ) peptide and intracellular neurofibrillary tangles which are composed of hyperphosphorylated tau protein [8]. Aβ peptide, a key mediator of AD pathology, span>is<span class="ws"></span>pro-duced<span class="ws"></span>af-ter<span class="wshbr"></span>se-quen-tial<span class="ws"></span>cleav-age<span class="ws"></span>of<span class="ws"></span>the<span class="ws"></span>amy-loid<span class="ws"></span>pre-cur-sor<span class="ws"></span>pro-tein<span class="ws"></span>by<span class="ws"></span>beta-<span class="ws"></span>and<span class="ws"></span>gamma-sec-re-tases<span class="wshbr"></span>and<span class="ws"></span>sub-se-quent<span class="ws"></span>ag-gre-ga-tion<span class="ws"></span>into<span class="ws"></span>amy-loid<span class="ws"></span>fib-rils,<span class="ws"></span>known<span class="ws"></span>to<span class="ws"></span>be<span class="ws"></span>a<span class="ws"></span>ma-jor<span class="ws"></span>com-po-nent<span class="wsbr"></span>of<span class="ws"></span>se-nile<span class="ws"></span>plaques<span class="ws"></span><a title="bib0045" class="ce_cross-ref" name="OPT_ID_308" id="OPT_ID_308">[9]</a>.<span class="ws"></span>Ag-gre-gated<span class="ws"></span>A<span class="unicode-char">β</span><span class="ws"></span>pep-tide<span class="ws"></span>in-clud-ing<span class="ws"></span>both<span class="ws"></span>oligomeric<span class="ws"></span>and<span class="wshbr"></span>fib-ril-lar<span class="ws"></span>species<span class="ws"></span>in-duces<span class="ws"></span>neu-ronal<span class="ws"></span>cell<span class="ws"></span>death<span class="ws"></span><span class="ce_italic" name="OPT_ID_309">in<span class="ws"></span>vitro</span><span class="ws"></span>and<span class="ws"></span><span class="ce_italic" name="OPT_ID_310">in<span class="ws"></span>vivo</span><span class="ws last-word"></span><a title="bib0050" class="ce_cross-ref" name="OPT_ID_311" id="OPT_ID_311">[10]</a>.<div class="wsp"></div></div><div class="ce_para" id="par0035" name="OPT_ID_312">Neu-ronal<span class="ws"></span>func-tions<span class="ws"></span>and<span class="ws"></span>their<span class="ws"></span>in-volve-ment<span class="ws"></span>in<span class="ws"></span>AD<span class="ws"></span>have<span class="ws"></span>drawn<span class="ws"></span>con-sid-er-able<span class="wshbr"></span>at-ten-tion<span class="ws"></span>to<span class="ws"></span>BDNF<span class="ws"></span>as<span class="ws"></span>a<span class="ws"></span>ther-a-peu-tic<span class="ws"></span>tar-get<span class="ws"></span>for<span class="ws"></span>AD<span class="ws"></span>treat-ment.<span class="ws"></span>How-ever,<span class="ws"></span>re-com-bi-nant<span class="wsbr"></span>BDNF<span class="ws"></span>it-self<span class="ws"></span>has<span class="ws"></span>poor<span class="ws"></span>phar-ma-co-ki-netic<span class="ws"></span>prop-er-ties<span class="cpeins" name="cpe_id_94"><span name="OPT_ID_313"></span>,</span><span class="ws"></span>such<span class="ws"></span>as<span class="ws"></span>a<span class="ws"></span>short<span class="ws"></span><span class="ce_italic" name="OPT_ID_314">in<span class="ws"></span>vivo</span><span class="ws"></span>half-life,<span class="wsbr"></span>low<span class="ws"></span>blood<span class="pc_cpereplace" name="cpe_id_95"><span class="cpedel hideme" name="cpe_id_95"><span name="OPT_ID_315"></span>-</span><span class="cpeins" name="cpe_id_95"><span name="OPT_ID_316"><span class="unicode-char">-</span></span></span>brain<span class="ws"></span>bar-rier<span class="ws"></span>pen-e-tra-bil-ity,<span class="ws"></span>and<span class="ws"></span>lim-ited<span class="ws"></span>dif-fu-sion<span class="ws"></span><a title="bib0055" class="ce_cross-ref" name="OPT_ID_317" id="OPT_ID_317">[11]</a>.<span class="ws"></span>Thus,<span class="ws"></span>a<span class="ws"></span>va-ri-ety<span class="ws"></span>of<span class="fillerText"></span></div></div></div></div><div class="footer-wrapper bottom-footer-wrapper"><div class="footnote-wrapper"></div><div class="top-ruler"></div><div class="pane-content"><div class="left-pane-content page-number">2</div><div class="center-pane-content"><span class="doi">http://dx.doi.org/10.1016/j.neu-let.2013.11.020</span><span class="copyright">1060-3743/@2013 The Authors. Published by Elsevier Limited.</span><span class="cc-license">This is an open access article under the CC BY-NC-ND license (http://creative-commons.org/licenses/by-nc-nd/4.0/).</span></div><div class="right-pane-content"></div></div></div>

Figure 4D:
FIG. 4D exemplarily illustrates a screenshot showing a source code of the marked-up content rendered in a reversible second file format.

The file format transformation system (FFTS) transforms the input hypertext markup language (HTML) page exemplarily illustrated in FIGS. 4A-4B, to an output page in the reversible file format, that is, the PH5 format as exemplarily illustrated in FIG. 4C. In the output page in the PH5 format, the FFTS replaces each of the word spaces identified in the marked-up content of the input hypertext markup language (HTML) page exemplarily illustrated in FIG. 4A, with a tag <span class="ws">, and tags each of the line breaks with a tag <span class="wsbr">. The FFTS further hyphenates words where appropriate. The FFTS also introduces a tag <span class="fillerText"> to fill in orphan and widow sections with filler text. The FFTS retains the original HTML tags and appends the PH5 format tags to the marked-up content. FIG. 4D exemplarily illustrates a screenshot showing a source code of the marked-up content rendered in the reversible file format, that is, the PH5 format.

Figure 5:
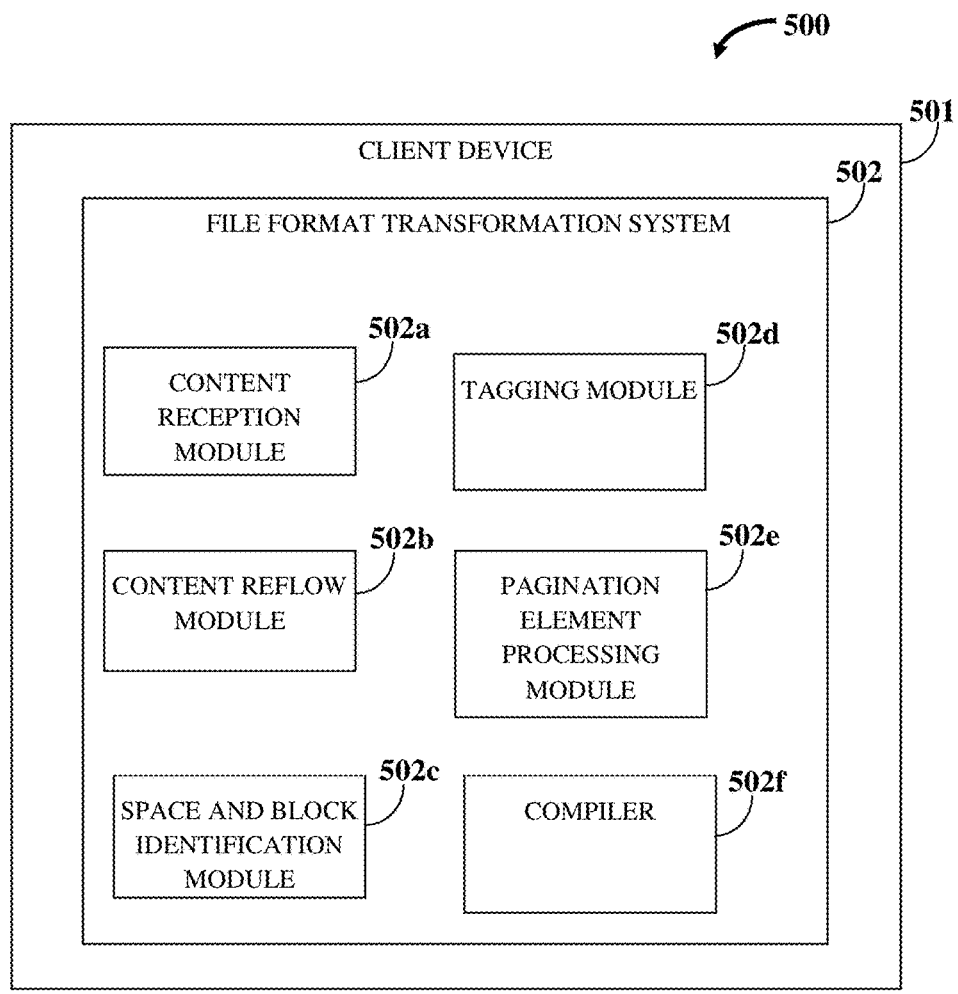
FIG. 5 illustrates a system comprising a file format transformation system deployed on a client device for transforming marked-up content in a first file format to a reversible second file format.

FIG. 5 exemplarily illustrates a system 500 comprising a file format transformation system (FFTS) 502 deployed on a client device 501 for transforming marked-up content in a first file format to a reversible second file format. The client device 501 can be, for example, a personal computer, a tablet computing device, a mobile computer, a mobile phone, a smart phone, a portable computing device, a laptop, a personal digital assistant, a touch centric device, a workstation, a portable electronic device, a network enabled computing device, an interactive network enabled communication device, any other suitable computing equipment, combinations of multiple pieces of computing equipment, etc. In an embodiment, the FFTS 502 is implemented as a standalone software application on the client device 501.

The system 500 disclosed herein comprises a non-transitory computer readable storage medium such as a memory unit, and at least one processor communicatively coupled to the non-transitory computer readable storage medium on the client device 501. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium stores computer program instructions defined by modules, for example, 502a, 502b, 502c, 502d, 502e, 502f, etc., of the FFTS 502. The processor is configured to execute the defined computer program instructions.

The file format transformation system (FFTS) 502 further comprises a content reception module 502a, a content reflow module 502b, a space and block identification module 502c, a tagging module 502d, a pagination element processing module 502e, and a compiler 502f. The content reception module 502a receives the marked-up content of the first file format, for example, the hypertext markup language (HTML) format. An example of a pseudocode of the content reception module 502a executed to receive the marked-up content of the first file format is provided below:

```
function receiveContent(self, container, source) {
    var innerContainer = null, paginator = null; var content = null;
    generateContentContainer(self, container);
    paginator = domHelper.create('div');
    paginator.classList.add('paginator');
    domHelper.append(paginator, container);
    content = source;
    content = insertSoftHyphensForAllWords(content);
    innerContainer = self.domHelper.find(container, '.paginator');
    innerContainer.innerHTML = source;
}
```

The content reflow module 502b reflows the received marked-up content of the first file format into a continuous page having a configurable page width. An example of a pseudocode of the content reflow module 502b executed to reflow the received marked-up hypertext markup language (HTML) content is provided below:

```
var options = {
    "options": {
        "page": {
            "height": "262",
            "width": "192",
            "unit": "mm"
        }
    }
}
function reflowContent(options) {
    var width = [
        "width",
        ":",
        self.options.page.width,
        self.options.page.unit
    ].join('');
    self.domHelper.addOrModifyAttribute('style', width, target);
}
```

The space and block identification module 502c identifies spaces and block elements in the reflown marked-up content of the first file format. An example of a pseudocode of the space and block identification module 502c executed to identify and tag spaces and block elements in the reflown marked-up hypertext markup language (HTML) content is provided below:

```
function putSpanForWordSpace(self, content) {
    var ws = self.ws;
    content.find('*:visible').contents( ).filter(function ( ) {
        var value = "";
        if (this.nodeType === 3) {
            value = this.nodeValue;
            if (value.indexOf(" ") !== -1) {
                return true;
            }
        }
        return false;
    })
    .replaceWith(function ( ) {
        var str = "", spaces = [ ], replacedStr = "", dummy = null,
            finalstr = "";
        str = jQ(this).text( );
        dummy = jQ('<div></div>');
        finalstr = dummy.text(str).html( );
        spaces = finalstr.split(' ');
        replacedStr = spaces.join("<span data-ph5='ws'> </span>");
        return replacedStr;
    });
}
function identifyBlockElements(content) {
    visibleDivs = content.find('div:visible');
    length = visibleDivs.length;
    for (; i < length; i += 1) {
        visibleDiv = jQ(visibleDivs[i]);
        if (visibleDiv.css('display') !== "inline") {
            visibleDiv.append("<div data-ph5='wsp'></div>");
        }
    }
}
```

The tagging module 502d generates and appends tags to the identified spaces and the identified block elements in the reflown marked-up content of the first file format. For each of the identified spaces and the identified block elements, the pagination element processing module 502e determines line breaks in the reflown marked-up content of the first file format based on preconfigured criteria associated with the appended tags. The tagging module 502d tags the determined line breaks. An example of the pseudocode of the pagination element processing module 502e executed to determine the line breaks is provided below:

```
function determineLineBreaks( ) {
    paginationElements = content.find("span.ws,span.shy,div.wsp");
    length = paginationElements.length;
    for (; i < length; i += 1) {
        linebreak = false;
        curElement = jQ(paginationElements[i]);
        if ((curElement.class('ws') == true) && (curElement.width( ) == 0)) {
            linebreak = true;
        }
        else if ((curElement.class('shy') == true) && (curElement.width( ) == 1)) {
            linebreak = true;
        }
        else if (curElement.class('wsp') == true) {
            linebreak = true;
        }
        if (linebreak == true) {
            introduceLineBreak( );
        }
    }
}
```

For each of the determined line breaks, the pagination element processing module 502e identifies anchored floats in the reflown marked-up content of the first file format. The tagging module 502d tags the identified anchored floats. Further, for each of the determined line breaks, the pagination element processing module 502e positions the tagged anchored floats on a current page based on availability of space for the tagged anchored floats on the current page. The pagination element processing module 502e positions the tagged anchored floats proximal to associated float citations on the current page based on the availability of space for the tagged anchored floats on the current page. An example of a pseudocode of the pagination element processing module 502e executed to position anchored floats in the output hypertext markup language (HTML) document is provided below:

```
if (lbr.hasClass('float-anchor') === true) { // if a line has float anchor
    floatHeight = getFloatHeight(floatItem);
    if (currentFilledHeight + floatHeight < pageHeight) {
        pushFloatToCurrentPage(floatItem);
        currentFilledHeight = currentFilledHeight + floatHeight;
    } else {
        pushFloatToNextAvailablePage(floatItem);
    }
}
```

Further, for each of the determined line breaks, the pagination element processing module 502e identifies footnotes in the reflown marked-up content of the first file format. The tagging module 502d tags the identified footnotes. Further, for each of the determined line breaks, the pagination element processing module 502e positions the tagged footnotes at a footnote section on the current page based on availability of space for the tagged footnotes on the current page. The pagination element processing module 502e positions the tagged footnotes proximal to associated footnote citations on the current page based on the availability of space for the tagged footnotes on the current page. An example of a pseudocode of the pagination element processing module 502e executed to position footnotes in the output hypertext markup language (HTML) document is provided below:

```
if (lbr.hasClass('footnote') === true) { // if a line has footnote
    footnoteHeight = getFootnoteHeight(footnoteItem);
    if (currentFilledHeight + footnoteHeight < pageHeight) {
        pushFootnoteToCurrentPage(footnoteItem);
        currentFilledHeight = currentFilledHeight + footnoteHeight;
    } else {
        pushCurrentLineAndRelatedFootnotesToNextPage( );
    }
}
```

Further, the pagination element processing module 502e positions page breaks in the continuous page based on a configurable page height and the determined line breaks for the positioning of the tagged anchored floats and the tagged footnotes on a subsequent page on non-availability of space on the current page. An example of a pseudocode of the pagination element processing module 502e executed to create pages in the output hypertext markup language (HTML) document is provided below:

```
var wordSpaces = $(document.body).find('span.ws,div.wsp');
for(var i=0; i < wordSpaces.length; i++) {
    var ws = wordSpaces.eq(i);
    if(ws.width( ) == 0 || ws.attr('class') == 'wsp') { // its a line break
        var y = ws.offset( ).top;
        if(y-ydef > px) {
            pageSize.push(y-ydef);
            ydef = y;
            pageBreak = ws.attr('class','wspbr');
        }
    }
}
```

The compiler 502f groups the marked-up content with the positioned anchored floats and the positioned footnotes on each page. The pagination element processing module 502e inserts one or more pagination elements, for example, page numbers, a header, a footer, a footnote ruler, fillers, etc., on each page containing the grouped marked-up content. The compiler 502f renders the grouped marked-up content with the inserted pagination elements in the reversible second file format. An example of the pseudocode of the compiler 502f executed for performing the steps of grouping and insertion of page numbers is provided below:

```
function makePageBlocks( ) {
    var pageBreaks = content.find(".wspr");
    var startPage = content.top( );
    for(var i=0; i < pageBreaks.length; i++) {
        endPage = pageBreaks[i];
        wrapPageWithNumber("<div class='page" + i + "'>", i, startPage, endPage);
        startPage = endPage;
    }
}
```

The pagination element processing module 502e handles grouped elements comprising, for example, a float and a caption associated with the float in the reversible second file format at a position assigned in the marked-up content of the first file format to the float. If a user wants to revert back to the input marked-up content page, the compiler 502f reverses the marked-up content in the reversible second file format to the first file format to restore the continuous page. An example of the pseudocode of the compiler 502f executed for reversing the PH5 mark-up to the original input (HTML) mark-up is provided below:

```
function removePaginationArtifacts( ) {
    var headerFooter = content.find(".page-header-footer");
    headerFooter.remove( );
    var footnotes = content.find(".footnote");
    footnotes.moveToEndOfDocument( );
    var floats = content.find(".floats");
    floats.moveAfterCitationPara( );
    var paginationElements = content.find(".ws,.shy,.wsp");
    paginationElements.removeTagsWithContent( );
    removeSoftHyphensAndPseudoBreaks( );
}
```

Figure 6:
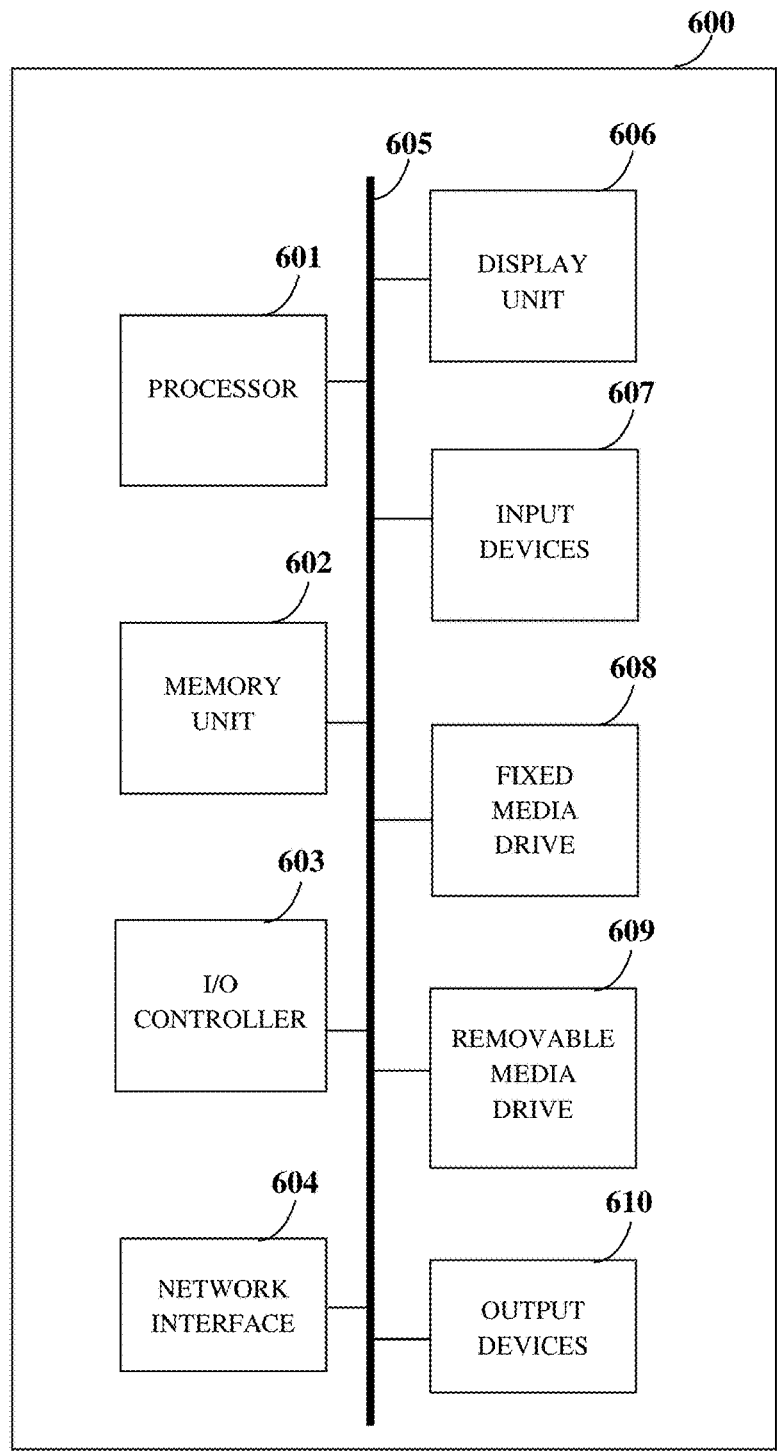
FIG. 6 exemplarily illustrates the hardware architecture of a client device that deploys the file format transformation system for transforming marked-up content in a first file format to a reversible second file format.

FIG. 6 exemplarily illustrates the hardware architecture 600 of a client device 501 that deploys the file format transformation system (FFTS) 502 exemplarily illustrated in FIG. 5, for transforming marked-up content in a first file format to a reversible second file format. The FFTS 502 is deployed on a computer system of the client device 501 and is programmable using a high level computer programming language. The FFTS 502 may be implemented using programmed and purposeful hardware. As exemplarily illustrated in FIG. 6, the hardware architecture 600 of the client device 501 comprises a processor 601, a non-transitory computer readable storage medium such as a memory unit 602 for storing computer programs and data, an input/output (I/O) controller 603, a network interface 604, a data bus 605, a display unit 606, input devices 607, a fixed media drive 608 such as a hard drive, a removable media drive 609 for receiving removable media, output devices 610, etc. The processor 601 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 601 may also be implemented as a processor set comprising, for example, a programmed microprocessor and a math or graphics co-processor. The processor 601 is selected, for example, from the Intel® processors such as the Itanium® microprocessor or the Pentium® processors, Advanced Micro Devices (AMD®) processors such as the Athlon® processor, UltraSPAR® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The FFTS 502 disclosed herein is not limited to employing a processor 601. The FFTS 502 may also employ a controller or a microcontroller. The processor 601 executes the modules, for example, 502a, 502b, 502c, 502d, 502e, 502f, etc., of the FFTS 502 exemplarily illustrated in FIG. 5.

The memory unit 602 is used for storing computer programs, applications, and data. For example, the content reception module 502a, the content reflow module 502b, the space and block identification module 502c, the tagging module 502d, the pagination element processing module 502e, the compiler 502f, etc., exemplarily illustrated in FIG. 5, are stored in the memory unit 602 of the client device 501. The memory unit 602 is, for example, a random access memory (RAM) or another type of dynamic storage device that stores information and instructions for execution by the processor 601. The memory unit 602 also stores temporary variables and other intermediate information used during execution of the instructions by the processor 601. The client device 501 further comprises a read only memory (ROM) or another type of static storage device that stores static information and instructions for the processor 601. The I/O controller 603 controls input actions and output actions performed by the FFTS 502.

The network interface 604 enables connection of the client device 501 to a network, for example, a short range network or a long range network. The network is, for example, the internet. In an embodiment, the network interface 604 is provided as an interface card also referred to as a line card. The network interface 604 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 605 permits communications between the modules, for example, 502a, 502b, 502c, 502d, 502e, 502f, etc., of the FFTS 502 exemplarily illustrated in FIG. 5.

The display unit 606, via the graphical user interface (GUI) 401 exemplarily illustrated in FIGS. 4A-4C, displays information such as the marked-up content, display interfaces, user interface elements such as text fields, etc., for allowing a user of the file format transformation system (FFTS) 502 to view an input page in a first file format and a transformed output page in the reversible second file format. The display unit 606 comprises, for example, a liquid crystal display, a plasma display, an organic light emitting diode (OLED) based display, etc. The input devices 607 are used for inputting data into the client device 501. The users of the client device 501 use the input devices 607 to provide inputs to the FFTS 502. For example, a user may enter a file format or edit an input page on the GUI 401 using the input devices 607. The input devices 607 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and computer programs are used for operating the file format transformation system (FFTS) 502. The computer programs are loaded onto the fixed media drive 608 and into the memory unit 602 of the client device 501 via the removable media drive 609. In an embodiment, the computer applications and computer programs may be loaded directly via the network. Computer applications and computer programs are executed by double clicking a related icon displayed on the display unit 606 using one of the input devices 607. The output devices 610, for example, a printer outputs the results of operations performed by the FFTS 502. For example, the FFTS 502 renders the transformed output page in the reversible second file format using the output devices 610.

The processor 601 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The file format transformation system (FFTS) 502 employs the operating system for performing multiple tasks. The operating system is responsible for management and coordination of activities and sharing of resources of the client device 501. The operating system further manages security of the FFTS 502, peripheral devices connected to the client device 501, and network connections. The operating system employed on the client device 501 recognizes, for example, inputs provided by the users using one of the input devices 607, the output display, files, and directories stored locally on the fixed media drive 608. The operating system on the client device 501 executes different computer programs using the processor 601. The processor 601 and the operating system together define a computer system for which application programs in high level programming languages are written.

The processor 601 of the client device 501 retrieves instructions defined by the content reception module 502a, the content reflow module 502b, the space and block identification module 502c, the tagging module 502d, the pagination element processing module 502e, the compiler 502f, etc., for performing respective functions disclosed in the detailed description of FIG. 5. The processor 601 retrieves instructions for executing the modules, for example, 502a, 502*b*, 502*c*, 502*d*, 502*e*, 502*f*, etc., of the FFTS 502 from the memory unit 602. A program counter determines the location of the instructions in the memory unit 602. The program counter stores a number that identifies the current position in the computer program of each of the modules, for example, 502*a*, 502*b*, 502*c*, 502*d*, 502*e*, 502*f*, etc., of the FFTS 502. The instructions fetched by the processor 601 from the memory unit 602 after being processed are decoded. The instructions are stored in an instruction register in the processor 601. After processing and decoding, the processor 601 executes the instructions, thereby performing one or more processes defined by those instructions.

At the time of execution, the instructions stored in the instruction register are examined to determine the operations to be performed. The processor 601 then performs the specified operations. The operations comprise arithmetic operations and logic operations. The operating system performs multiple routines for performing a number of tasks required to assign the input devices 607, the output devices 610, and memory for execution of the modules, for example, 502*a*, 502*b*, 502*c*, 502*d*, 502*e*, 502*f*, etc., of the file format transformation system (FFTS) 502. The tasks performed by the operating system comprise, for example, assigning memory to the modules, for example, 502*a*, 502*b*, 502*c*, 502*d*, 502*e*, 502*f*, etc., of the FFTS 502, and to data used by the FFTS 502, moving data between the memory unit 602 and disk units, and handling input/output operations. The operating system performs the tasks on request by the operations and after performing the tasks, the operating system transfers the execution control back to the processor 601. The processor 601 continues the execution to obtain one or more outputs. The outputs of the execution of the modules, for example, 502*a*, 502*b*, 502*c*, 502*d*, 502*e*, 502*f*, etc., of the FFTS 502 are displayed to the user on the display unit 606.

Disclosed herein is also a computer program product comprising a non-transitory computer readable storage medium having embodied thereon, computer program codes comprising instructions executable by at least one processor 601 for transforming marked-up content in a first file format to a reversible second file format. The computer program product comprises a first computer program code for receiving the marked-up content of the first file format; a second computer program code for reflowing the received marked-up content of the first file format into a continuous page having a configurable page width; a third computer program code for identifying spaces and block elements in the reflown marked-up content of the first file format; a fourth computer program code for generating and appending tags to the identified spaces and the identified block elements in the reflown marked-up content of the first file format; a fifth computer program code for determining line breaks in the reflown marked-up content of the first file format based on preconfigured criteria associated with the appended tags; a sixth computer program code for tagging the determined line breaks; a seventh computer program code for identifying anchored floats in the reflown marked-up content of the first file format; an eight computer program code for tagging the identified anchored floats; a ninth computer program code for positioning the tagged anchored floats on a current page based on availability of space for the tagged anchored floats on the current page; a tenth computer program code for identifying footnotes in the reflown marked-up content of the first file format; an eleventh computer program code for tagging the identified footnotes; a twelfth computer program code for positioning the tagged footnotes at a footnote section on the current page based on availability of space for the tagged footnotes on the current page; a thirteenth computer program code for positioning page breaks in the continuous page based on a configurable page height and the determined line breaks for positioning the tagged anchored floats and the tagged footnotes on a subsequent page on non-availability of the space on the current page; a fourteenth computer program code for grouping the marked-up content with the positioned anchored floats and the positioned footnotes on each page; and a fifteenth computer program code for inserting one or more of multiple pagination elements, for example, page numbers, a header, a footer, a footnote ruler, fillers, etc., on each page containing the grouped marked-up content; and a sixteenth computer program code for rendering the grouped marked-up content with the inserted pagination elements in the reversible second file format, where the reversible second file format allows the marked-up content to be reversed to the first file format to restore the continuous page. The ninth computer program code positions the tagged anchored floats proximal to associated float citations on the current page based on the availability of space for the tagged anchored floats on the current page. The twelfth computer program code positions the tagged footnotes proximal to associated footnote citations on the current page based on the availability of space for the tagged footnotes on the current page.

The computer program product disclosed herein further comprises one or more additional computer program codes for performing additional steps that may be required and contemplated for transforming marked-up content in a first file format to a reversible second file format. In an embodiment, a single piece of computer program code comprising computer executable instructions performs one or more steps of the computer implemented method disclosed herein for transforming marked-up content in a first file format to a reversible second file format. The computer program codes comprising computer executable instructions are embodied on the non-transitory computer readable storage medium. The processor 601 of the client device 501 retrieves these computer executable instructions and executes them. When the computer executable instructions are executed by the processor 601, the computer executable instructions cause the processor 601 to perform the steps of the computer implemented method for transforming marked-up content of a first file format to a reversible second file format.

Figure 7A:
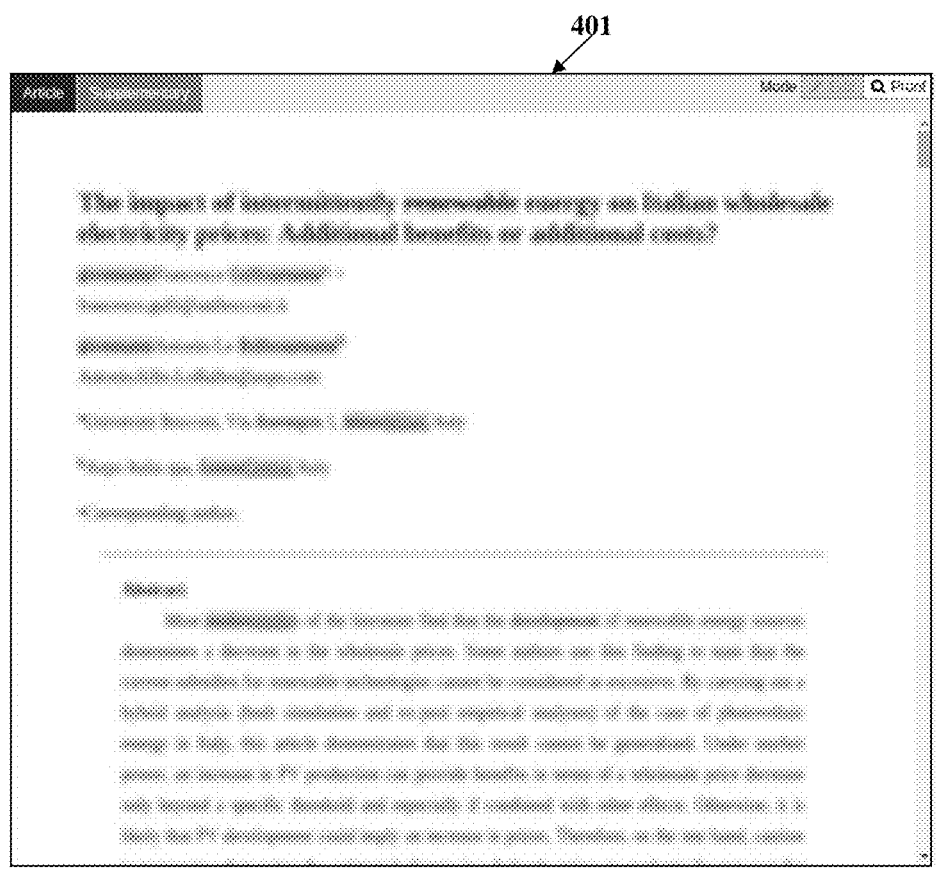
FIGS. 7A-7Q exemplarily illustrate screenshots showing transformation of marked-up content in a first file format to a reversible second file format in edit and proof views.
Figure 7B:
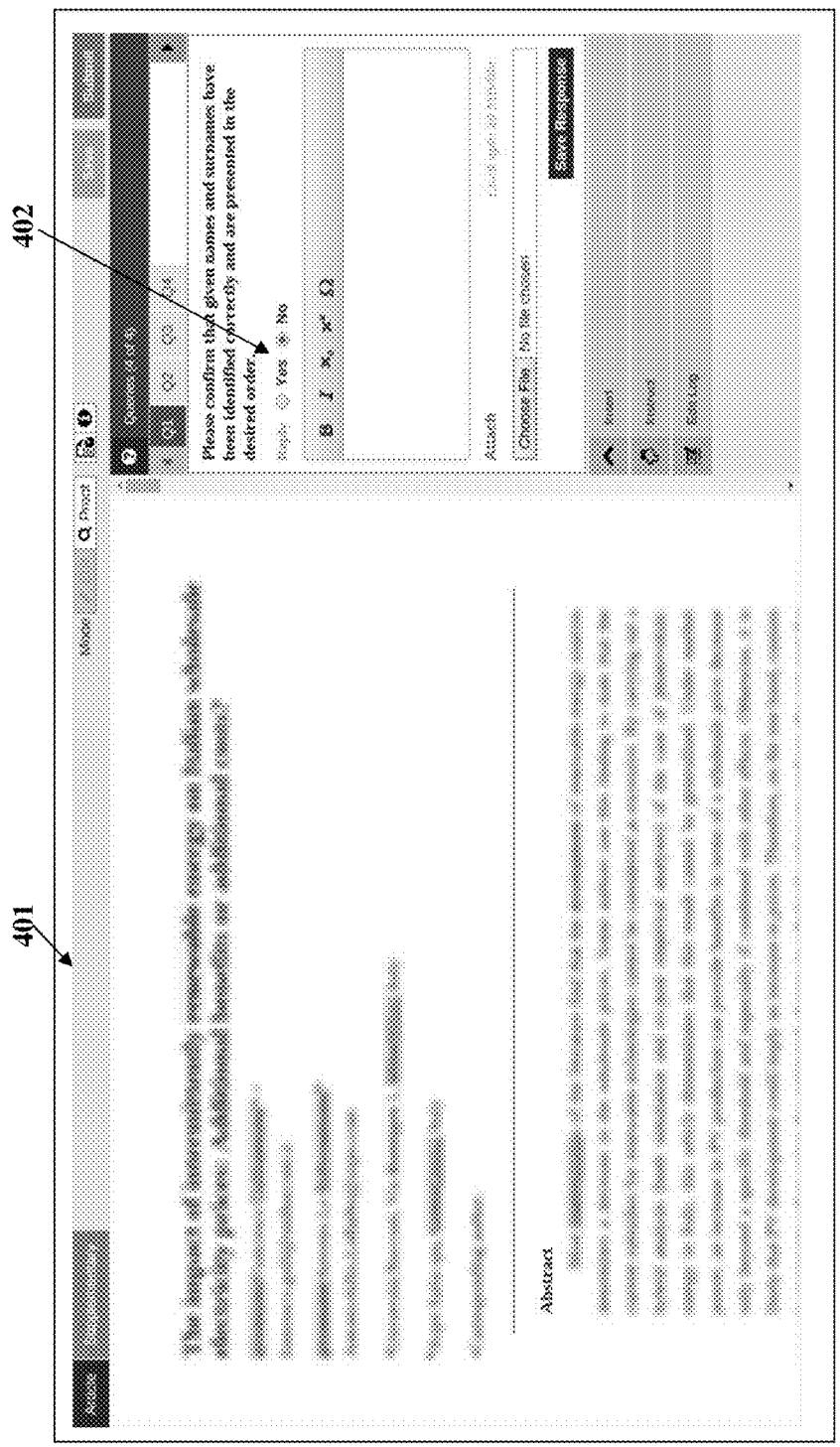
Figure 7C:
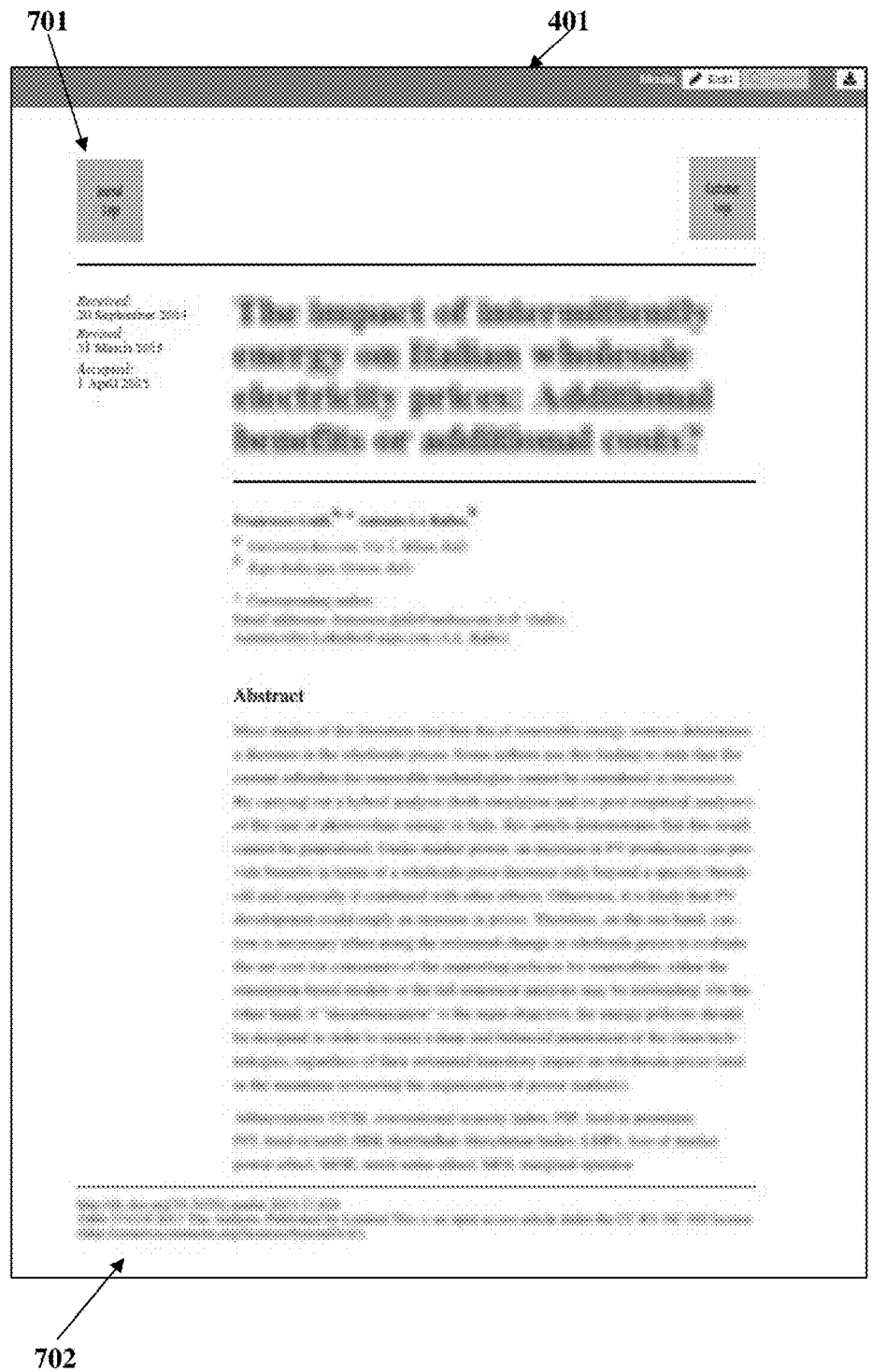
Figure 7D:
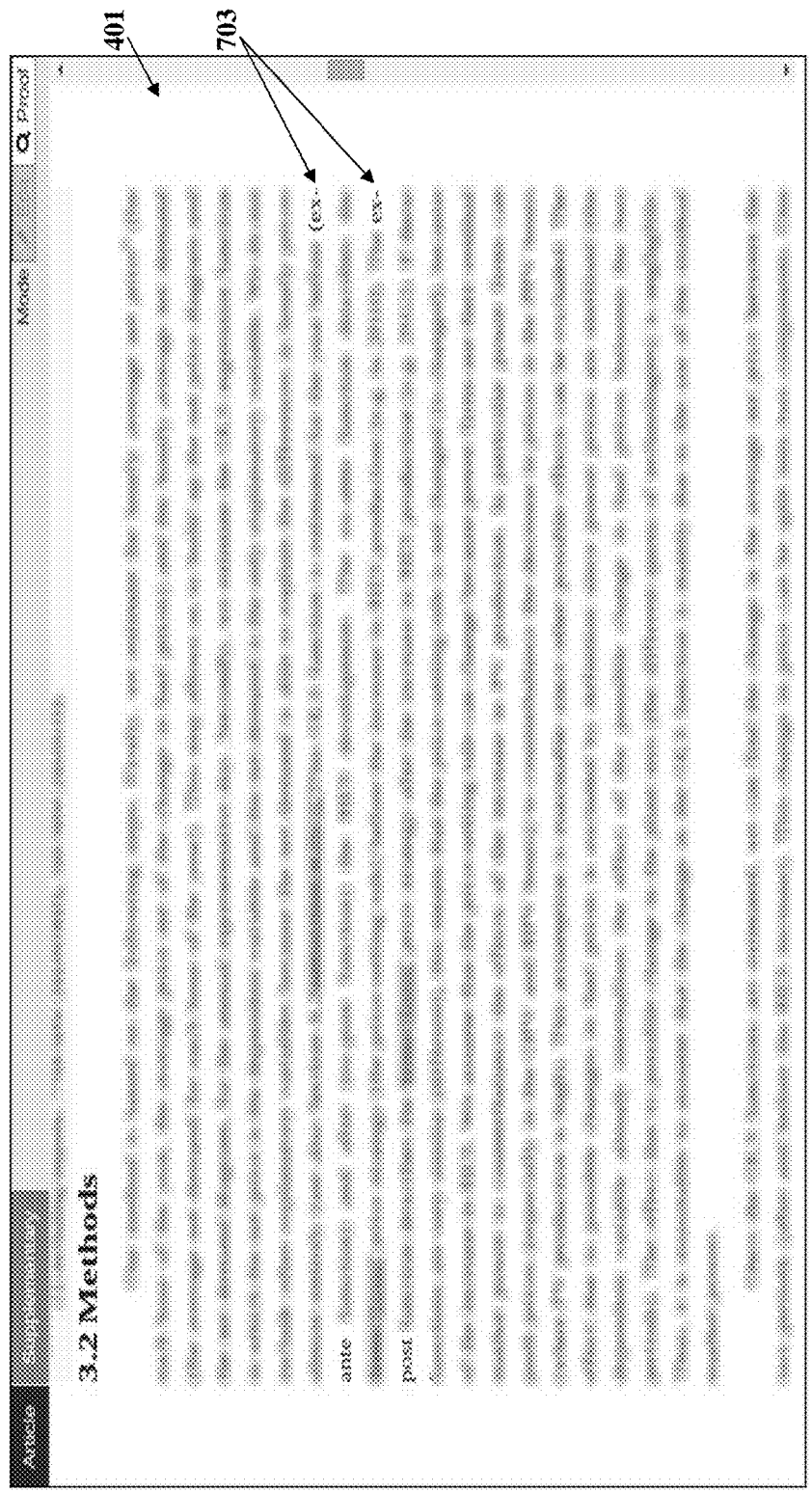
Figure 7E:
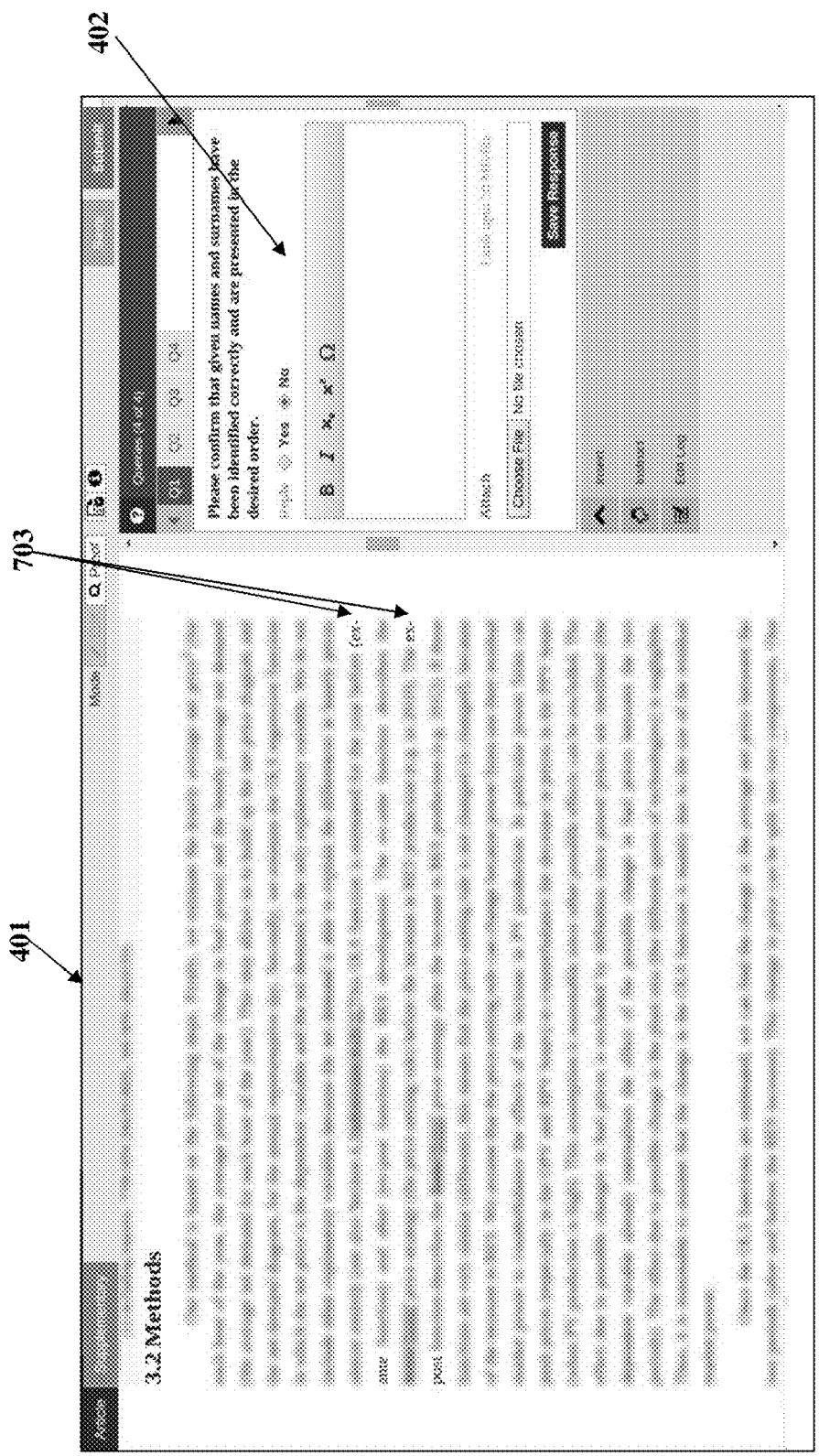
Figure 7F:
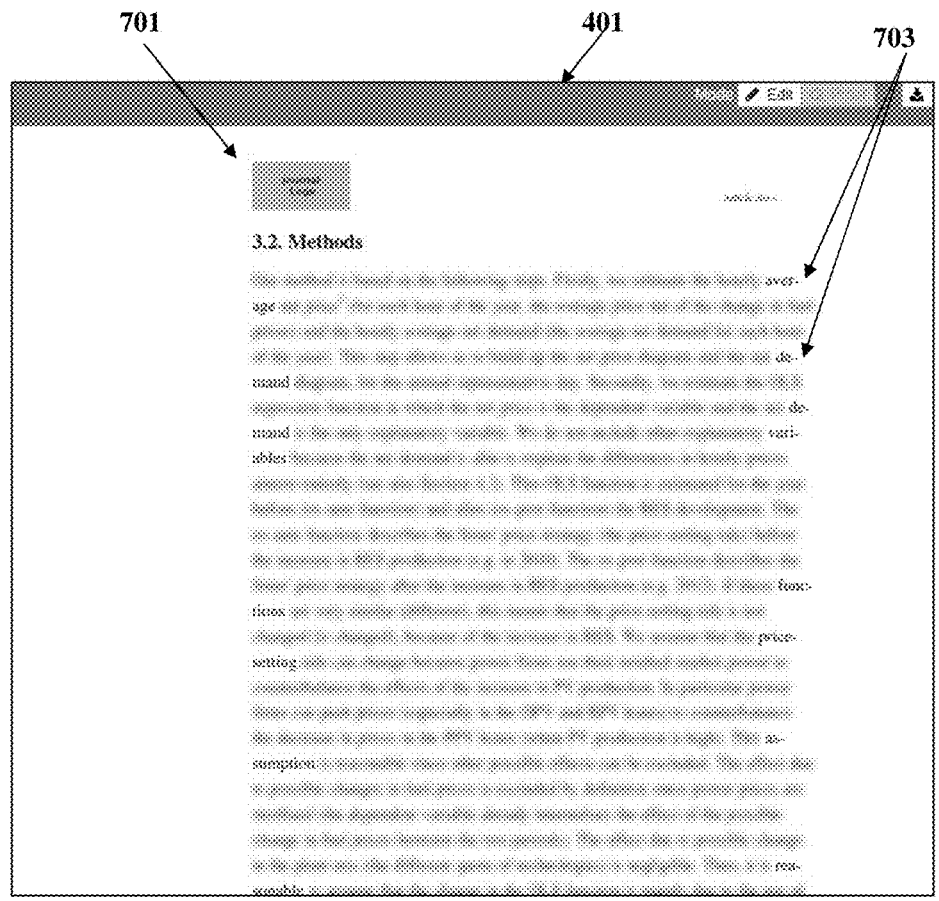
Figure 7G:
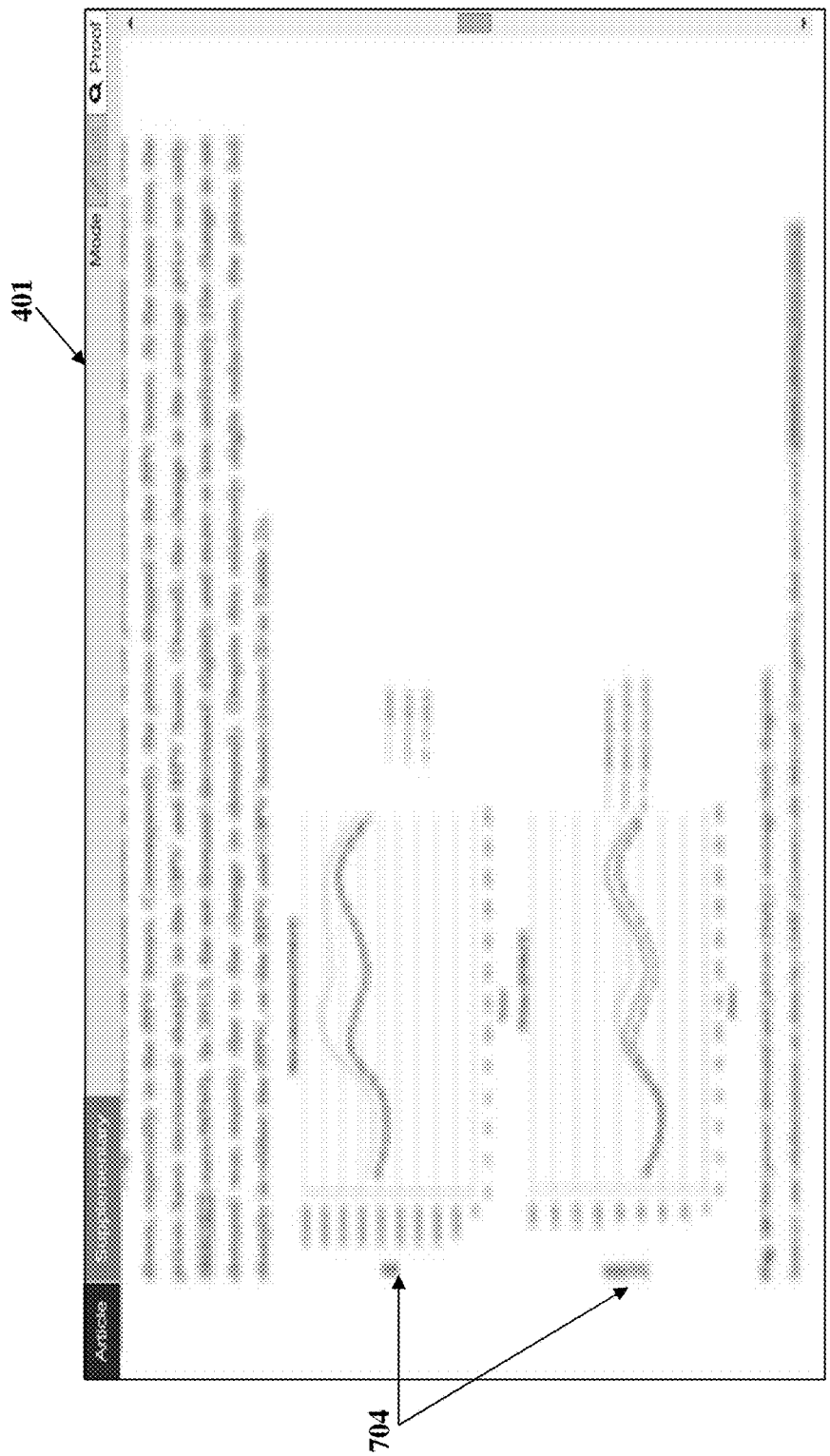
Figure 7H:
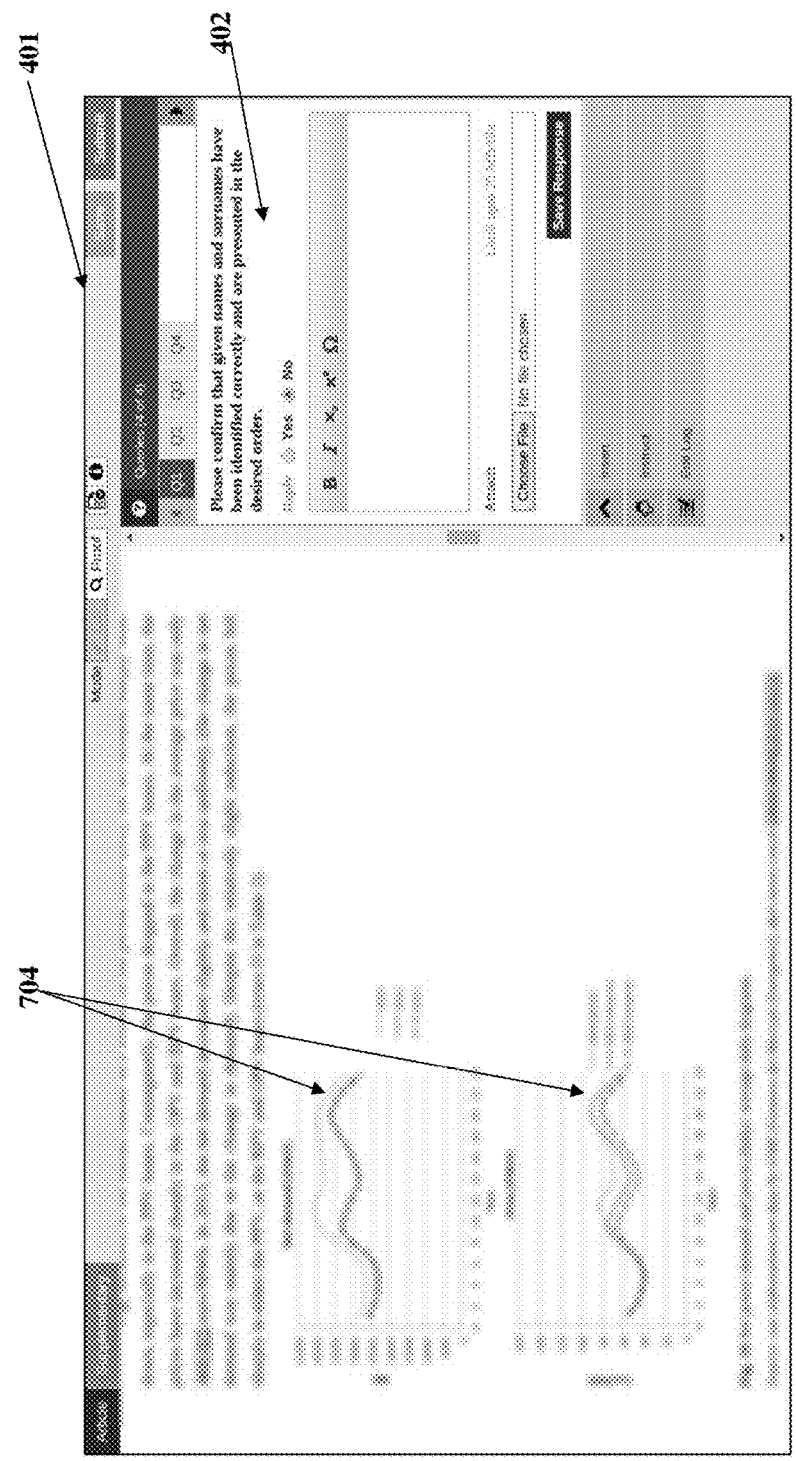
Figure 7I:
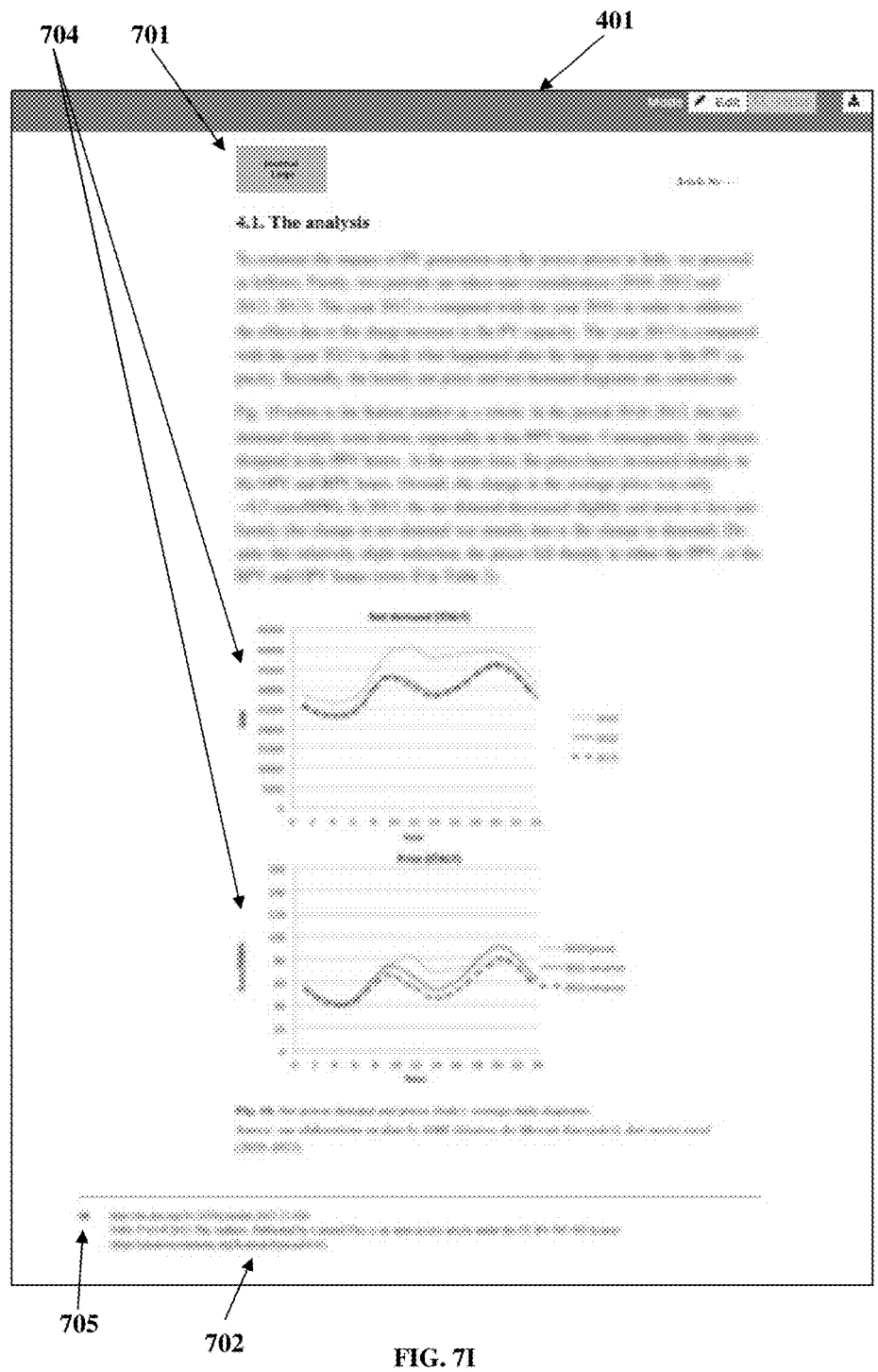
Figure 7J:
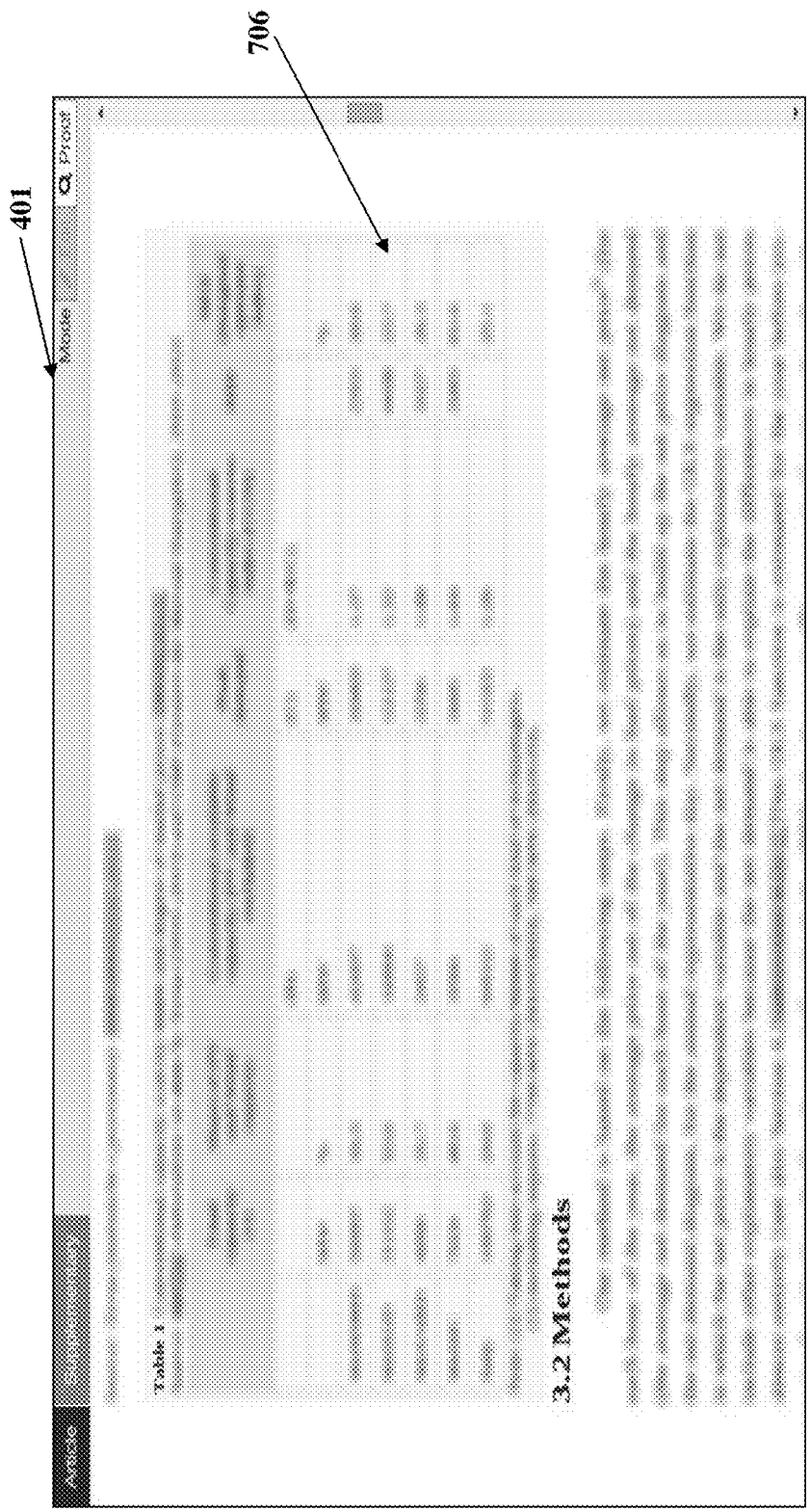
Figure 7K:
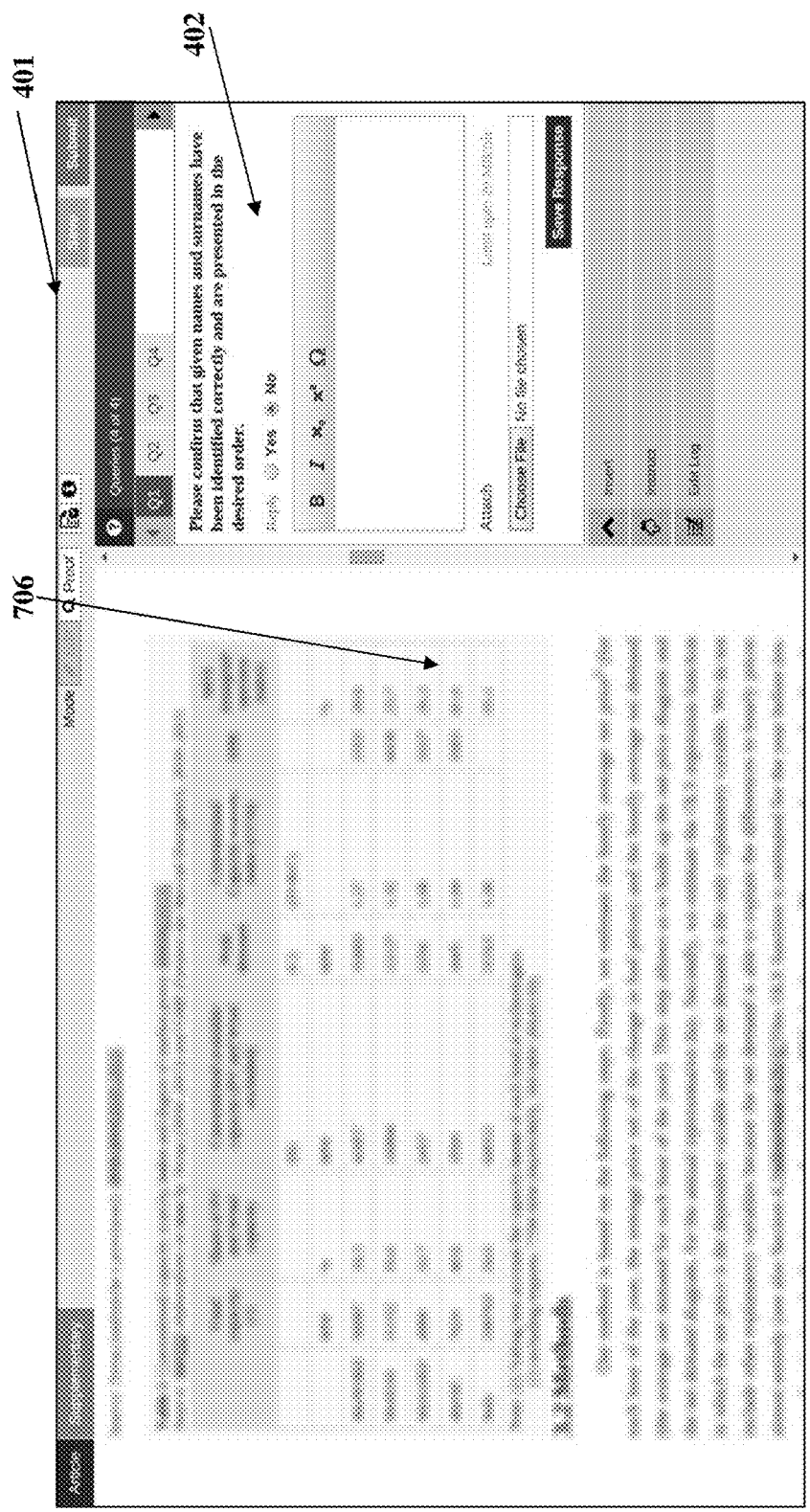
Figure 7L:
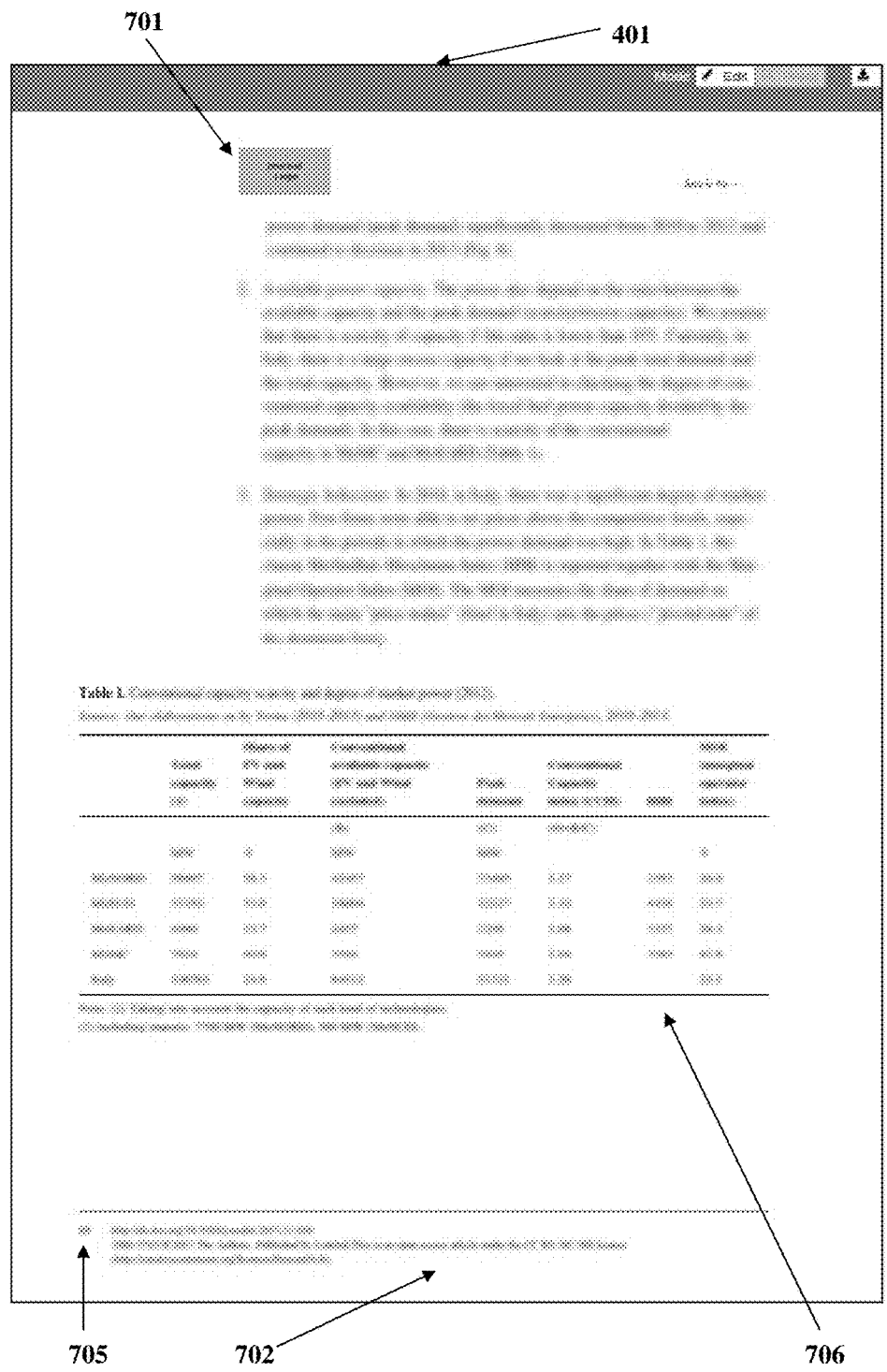
Figure 7M:
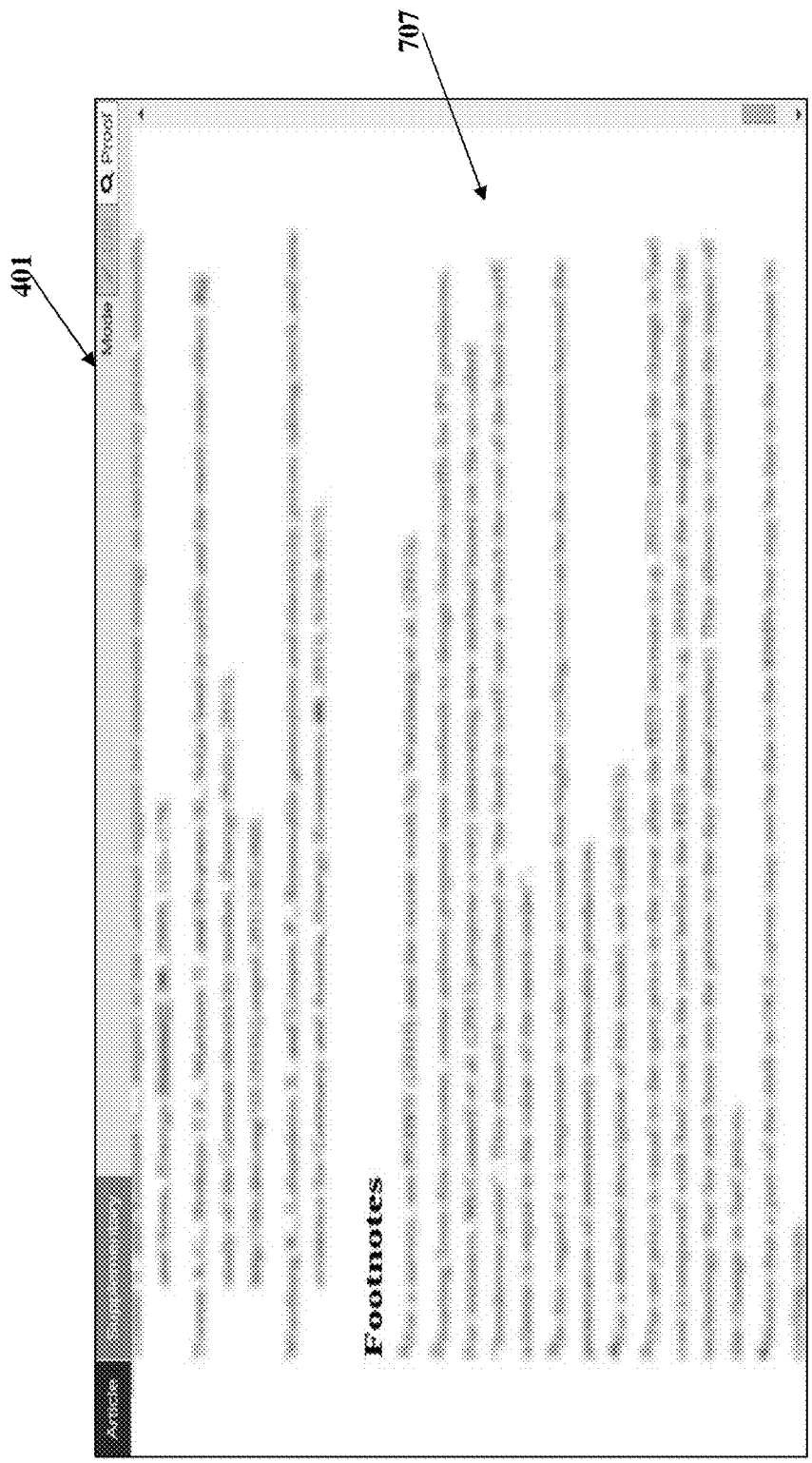
Figure 7N:
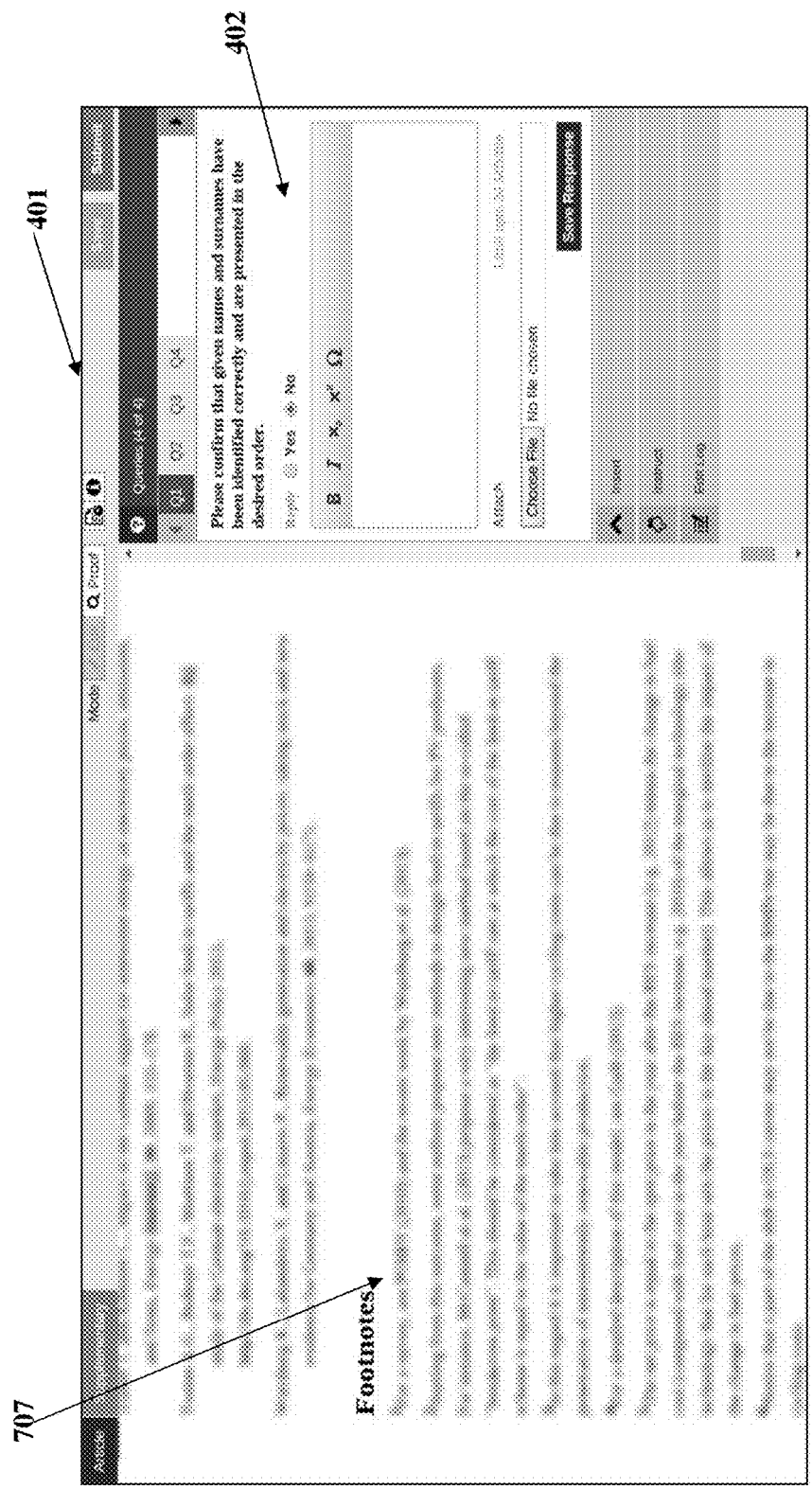
Figure 7O:
Figure 7P:
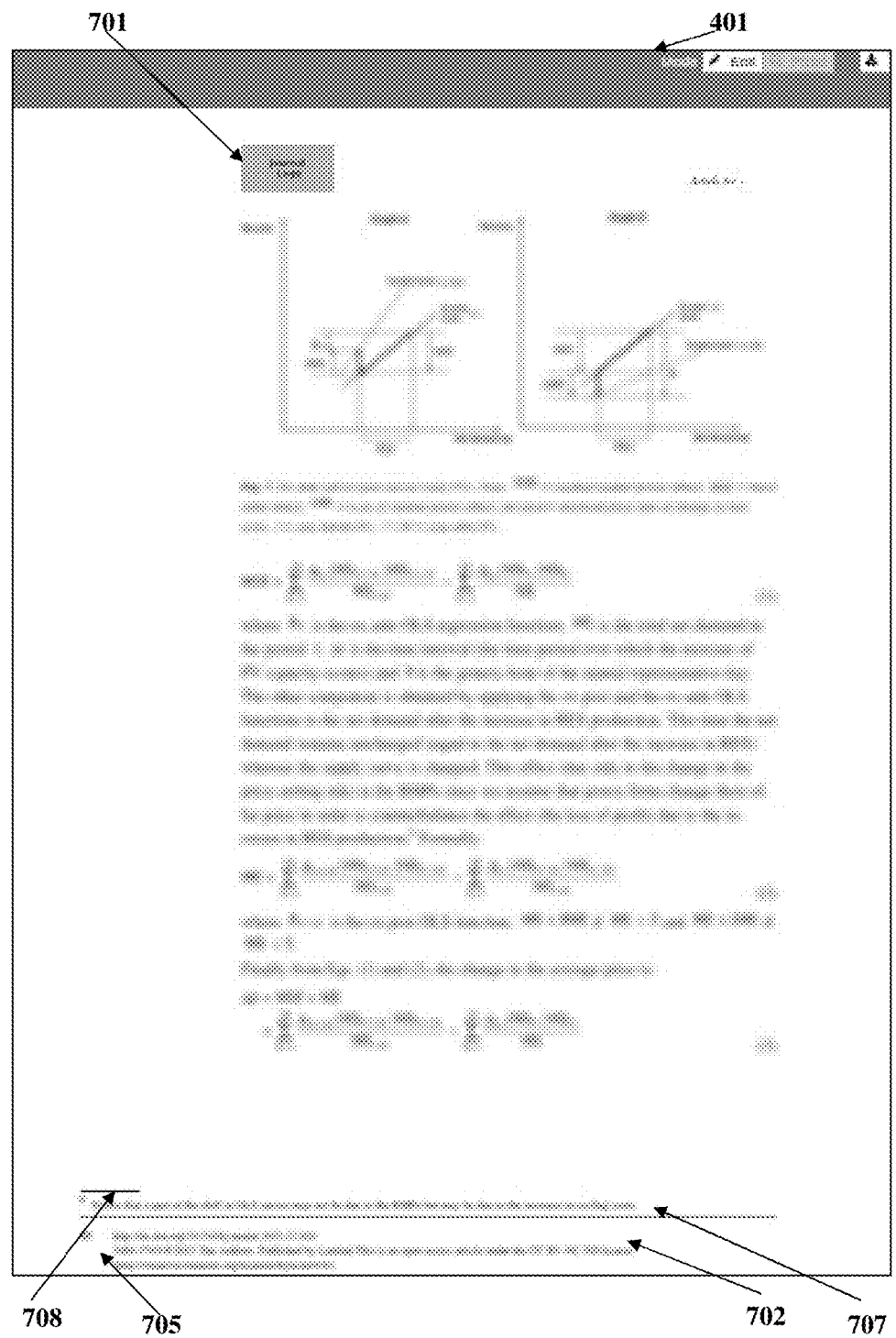
Figure 7Q:
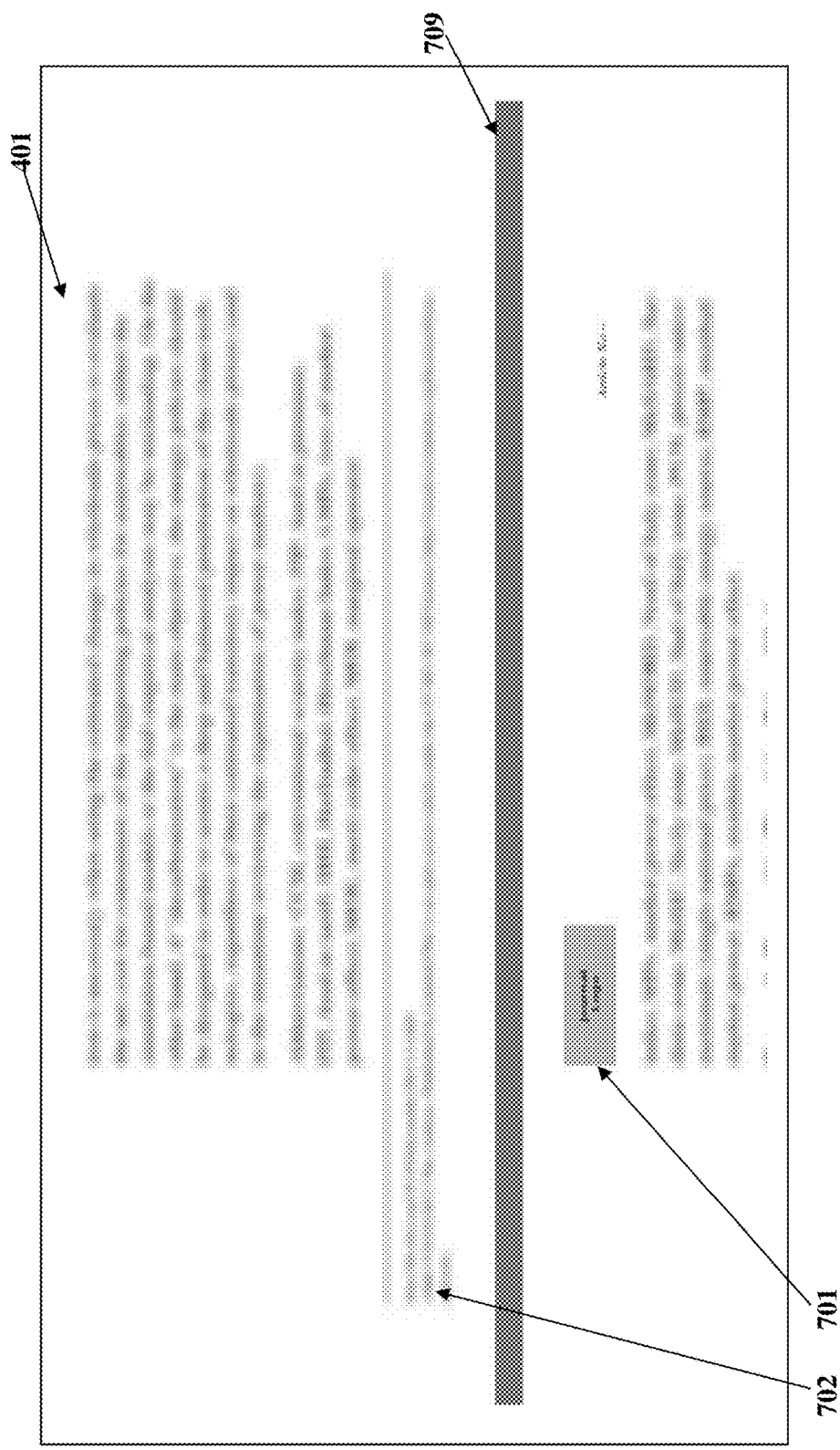

FIGS. 7A-7Q exemplarily illustrate screenshots showing transformation of marked-up content in a first file format to a reversible second file format in edit and proof views. Consider an example where the file format transformation system (FFTS) 502 is configured as a software application on a client device 501 exemplarily illustrated in FIG. 5, for example, a personal computer, a laptop, a smart phone, a tablet computing device, etc. A user of the client device 501 may want to edit and review a technical document of, for example, a hypertext markup language (HTML) format that is viewed as a running continuous page. The user invokes the FFTS 502 on the client device 501 and loads the input HTML document into the FFTS 502. The FFTS 502 allows the user to view the input HTML document via a graphical user interface (GUI) 401 of the FFTS 502. FIG. 7A exemplarily illustrates a screenshot of an opening page of the loaded input HTML document without an edit window 402 in a right pane of the GUI 401. FIG. 7B exemplarily illustrates a screenshot of the opening page of the loaded input HTML document, showing the edit window 402 in the right pane of the GUI 401. The edit window 402 allows the user to edit the input HTML document or accept suggested changes made by other users to the input HTML document in an edit view exemplarily illustrated in FIG. 7B. FIG. 7C exemplarily illustrates a screenshot of the output HTML page transformed by the FFTS 502 to a reversible file format, showing a header 701 and a footer 702 entered on the opening page in a proof view. The FFTS 502 positions the marked-up content in an appropriate location close to their respective citations in the proof view. The opening page in the reversible file format can be reversed to the first file format in the edit view.

FIG. 7D exemplarily illustrates a screenshot without the edit window 402 in the right pane of the GUI 401, showing hyphenations 703 entered in a page of the input hypertext markup language (HTML) document. FIG. 7E exemplarily illustrates a screenshot showing the hyphenations 703 entered in the HTML page, The user can edit the HTML page using the edit window 402 in the right pane of the GUI 401 exemplarily illustrated in FIG. 7E. The edit window 402 allows the user to edit the hyphenated HTML page. FIG. 7F exemplarily illustrates a screenshot of the output HTML page with hyphenations 703 transformed by the FFTS 502 to a reversible file format, showing the header 701 entered in the hyphenated HTML page in a proof view.

FIG. 7G exemplarily illustrates a screenshot of a page of the input hypertext markup language (HTML) document containing floats, for example, FIGS. 704, without the edit window 402 in the right pane of the GUI 401. FIG. 7H exemplarily illustrates a screenshot of the page of the input HTML document containing the FIGS. 704, showing the edit window 402 in the right pane of the GUI 401. The edit window 402 allows the user to edit the input HTML page containing the FIGS. 704. FIG. 7I exemplarily illustrates a screenshot of the output HTML page transformed by the file format transformation system (FFTS) 502 exemplarily illustrated in FIG. 5, to a reversible file format, showing the header 701, the footer 702, and a page number 705 entered on the output HTML page in a proof view. The FFTS 502 positions the FIG. 704 in the appropriate location close to a respective citation in the proof view.

FIG. 7J exemplarily illustrates a screenshot of a page of the input hypertext markup language (HTML) document containing a float, for example, a table 706, without the edit window 402 in a right pane of the GUI 401. FIG. 7K exemplarily illustrates a screenshot of the page of the input HTML document containing the table 706, showing the edit window 402 in the right pane of the GUI 401. The edit window 402 allows the user to edit the HTML page containing the table 706. FIG. 7L exemplarily illustrates a screenshot of the output HTML page transformed by the file format transformation system (FFTS) 502 exemplarily illustrated in FIG. 5, to a reversible file format, showing the header 701, the footer 702, and a page number 705 entered on the page in a proof view. The FFTS 502 positions the table 706 in the appropriate location close to a respective citation in the proof view.

FIG. 7M exemplarily illustrates a screenshot of a page of the input hypertext markup language (HTML) document containing footnotes 707, without the edit window 402 in a right pane of the GUI 401. FIG. 7N exemplarily illustrates a screenshot of the page of the input HTML document containing the footnotes 707, showing the edit window 402 in the right pane of the GUI 401. The edit window 402 allows the user to edit the page containing the footnotes 707. FIG. 7O exemplarily illustrates a screenshot of the output HTML page transformed by the file format transformation system (FFTS) 502 exemplarily illustrated in FIG. 5, to a reversible file format, showing the header 701, the footer 702, a page number 705 entered on the page, and the footnotes 707 positioned in the footnote section below a footnote ruler 708 in a proof view.

FIG. 7P exemplarily illustrates a screenshot of an output HTML page transformed by the file format transformation system (FFTS) 502 exemplarily illustrated in FIG. 5, to a reversible file format, showing the header 701 and the footer 702 at the top and the bottom of the page respectively in a proof view. The output HTML page also contains a page number 705 and a footnote 707 positioned in the footnote section below a footnote ruler 708 in the proof view.

FIG. 7Q exemplarily illustrates a screenshot of output HTML pages transformed by the file format transformation system (FFTS) 502 exemplarily illustrated in FIG. 5, to a reversible file format, showing a page break 709 in a proof view. The FFTS 502 breaks the running continuous input HTML page into individual reversible file format pages containing a header 701 and a footer 702, and renders the output on the GUI 401.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware. The computer program codes comprising computer executable instructions may be implemented in any programming language that runs on an internet browser, for example, Chrome™ of Google Inc., Firefox® of Mozilla Foundation, Safari® of Apple Inc., Internet Explorer® of Microsoft Corporation, etc., on any operating system. The computer program codes or software programs may be stored on or in one or more mediums as object code. Various aspects of the computer implemented method and the file format transformation system (FFTS) 502 disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the computer implemented method and the FFTS 502 disclosed herein may be implemented as programmed elements, or non-programmed elements, or any suitable combination thereof. The computer program product disclosed herein comprises one or more computer program codes for implementing the processes of various embodiments. The computer implemented method and the FFTS 502 disclosed herein are not limited to a particular computer system platform, processor, or operating system.

The foregoing examples have been provided merely for the purpose of explanation and are in no way to be construed as limiting of the computer implemented method and the file format transformation (FFTS) system 502 disclosed herein. While the computer implemented method and the FFTS 502 have been described with reference to various embodiments, it is understood that the words, which have been used herein, are words of description and illustration, rather than words of limitation. Further, although the computer implemented method and the FFTS 502 have been described herein with reference to particular means, materials, and embodiments, the computer implemented method and the FFTS 502 are not intended to be limited to the particulars disclosed herein; rather, the computer implemented method and the FFTS 502 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and the FFTS 502 disclosed herein in their aspects.

We claim:

1. A computer implemented method for transforming marked-up content in a first file format to a reversible second file format, said method employing a file format transformation system deployed on a client device comprising at least one processor configured to execute computer program instructions for performing said method, said method comprising:

receiving said marked-up content of said first file format by said file format transformation system;

reflowing said received marked-up content of said first file format into a continuous page having a configurable page width by said file format transformation system;

identifying spaces and block elements in said reflown marked-up content of said first file format by said file format transformation system;

generating and appending tags to said identified spaces and said identified block elements in said reflown marked-up content of said first file format by said file format transformation system;

for each of said identified spaces and said identified block elements:

determining line breaks in said reflown marked-up content of said first file format based on preconfigured criteria associated with said appended tags by said file format transformation system and tagging said determined line breaks by said file format transformation system;

for each of said determined line breaks:

identifying anchored floats in said reflown marked-up content of said first file format by said file format transformation system and tagging said identified anchored floats by said file format transformation system;

positioning said tagged anchored floats on a current page by said file format transformation system based on availability of space for said tagged anchored floats on said current page;

identifying footnotes in said reflown marked-up content of said first file format by said file format transformation system and tagging said identified footnotes by said file format transformation system;

positioning said tagged footnotes at a footnote section on said current page by said file format transformation system based on availability of space for said tagged footnotes on said current page;

positioning page breaks in said continuous page by said file format transformation system based on a configurable page height and said determined line breaks for said positioning of said tagged anchored floats and said tagged footnotes on a subsequent page on non-availability of said space on said current page;

grouping said marked-up content with said positioned anchored floats and said positioned footnotes on each page by said file format transformation system; and inserting one or more of a plurality of pagination elements on said each page containing said grouped marked-up content by said file format transformation system; and rendering said grouped marked-up content with said inserted one or more of said pagination elements in said reversible second file format by said file format transformation system, wherein said reversible second file format allows said marked-up content to be reversed to said first file format to restore said continuous page.

2. The computer implemented method of claim 1, wherein said tagged anchored floats are positioned proximal to associated float citations on said current page based on said availability of said space for said tagged anchored floats on said current page.

3. The computer implemented method of claim 1, wherein said tagged footnotes are positioned proximal to associated footnote citations on said current page based on availability of space for said tagged footnotes on said current page.

4. The computer implemented method of claim 1, wherein said first file format is one of a hypertext markup language format, an extensible hypertext markup language format, and an extensible markup language format.

5. The computer implemented method of claim 1, wherein said determined line breaks retain integrity of said reversible second file format by hyphenating and adjusting spaces in said rendered marked-up content.

6. The computer implemented method of claim 1, further comprising handling grouped elements comprising a float and a caption associated with said float in said reversible second file format at a position assigned in said marked-up content of said first file format to said float by said file format transformation system.

7. The computer implemented method of claim 1, wherein said pagination elements comprise page numbers, a header, a footer, a footnote ruler, fillers, and any combination thereof.

8. The computer implemented method of claim 1, further comprising hyphenation and justification of said rendered marked-up content in said reversible second file format by said file format transformation system to provide kerning based on aesthetics.

9. The computer implemented method of claim 1, wherein said rendered marked-up content in said reversible second file format is accessible on a plurality of browsers on a plurality of operating systems.

10. A system for transforming marked-up content in a first file format to a reversible second file format, said system comprising:

a non-transitory computer readable storage medium configured to store computer program instructions defined by modules of a file format transformation system;

at least one processor communicatively coupled to said non-transitory computer readable storage medium, said at least one processor configured to execute said defined computer program instructions; and said file format transformation system comprising:

a content reception module configured to receive said marked-up content of said first file format;

a content reflow module configured to reflow said received marked-up content of said first file format into a continuous page having a configurable page width;

a space and block identification module configured to identify spaces and block elements in said reflown marked-up content of said first file format;

a tagging module configured to generate and append tags to said identified spaces and said identified block elements in said reflown marked-up content of said first file format;

for each of said identified spaces and said identified block elements:

a pagination element processing module configured to determine line breaks in said reflown marked-up content of said first file format based on pre-configured criteria associated with said appended tags, wherein said tagging module is further configured to tag said determined line breaks;

for each of said determined line breaks:

said pagination element processing module further configured to identify anchored floats in said reflown marked-up content of said first file format, wherein said tagging module is further configured to tag said identified anchored floats;

said pagination element processing module further configured to position said tagged anchored floats on a current page based on availability of space for said tagged anchored floats on said current page;

said pagination element processing module further configured to identify footnotes in said reflown marked-up content of said first file format, wherein said tagging module is further configured to tag said identified footnotes;

said pagination element processing module further configured to position said tagged footnotes at a footnote section on said current page based on availability of space for said tagged footnotes on said current page;

said pagination element processing module further configured to position page breaks in said continuous page based on a configurable page height and said determined line breaks for said positioning of said tagged anchored floats and said tagged footnotes on a subsequent page on non-availability of said space on said current page;

a compiler configured to group said marked-up content with said positioned anchored floats and said positioned footnotes on each page; and said pagination element processing module further configured to insert one or more of a plurality of pagination elements on said each page containing said grouped marked-up content; and said compiler further configured to render said grouped marked-up content with said inserted one or more of said pagination elements in said reversible second file format, wherein said reversible second file format allows said marked-up content to be reversed to said first file format to restore said continuous page.

11. The system of claim 10, wherein said pagination element processing module is configured to position said tagged anchored floats proximal to associated float citations on said current page based on said availability of said space for said tagged anchored floats on said current page.

12. The system of claim 10, wherein said pagination element processing module is configured to position said tagged footnotes proximal to associated footnote citations on said current page based on said availability of said space for said tagged footnotes on said current page.

13. The system of claim 10, wherein said first file format is one of a hypertext markup language format, an extensible hypertext markup language format, and an extensible markup language format.

14. The system of claim 10, wherein said determined line breaks retain integrity of said reversible second file format by hyphenating and adjusting spaces in said rendered marked-up content.

15. The system of claim 10, wherein said pagination element processing module is further configured to handle grouped elements comprising a float and a caption associated with said float in said reversible second file format at a position assigned in said marked-up content of said first file format to said float.

16. The system of claim 10, wherein said pagination elements comprise page numbers, a header, a footer, a footnote ruler, fillers, and any combination thereof.

17. A computer program product comprising a non-transitory computer readable storage medium having embodied thereon, computer program codes comprising instructions executable by at least one processor for transforming marked-up content in a first file format to a reversible second file format, said computer program codes comprising:

a first computer program code for receiving said marked-up content of said first file format;

a second computer program code for reflowing said received marked-up content of said first file format into a continuous page having a configurable page width;

a third computer program code for identifying spaces and block elements in said reflown marked-up content of said first file format;

a fourth computer program code for generating and appending tags to said identified spaces and said identified block elements in said reflown marked-up content of said first file format;

for each of said identified spaces and said identified block elements:

a fifth computer program code for determining line breaks in said reflown marked-up content of said first file format based on preconfigured criteria associated with said appended tags and a sixth computer program code for tagging said determined line breaks; for each of said determined line breaks:

a seventh computer program code for identifying anchored floats in said reflown marked-up content of said first file format and an eight computer program code for tagging said identified anchored floats;

a ninth computer program code for positioning said tagged anchored floats on a current page based on availability of space for said tagged anchored floats on said current page;

a tenth computer program code for identifying footnotes in said reflown marked-up content of said first file format and an eleventh computer program code for tagging said identified footnotes;

a twelfth computer program code for positioning said tagged footnotes at a footnote section on said current page based on availability of space for said tagged footnotes on said current page;

a thirteenth computer program code for positioning page breaks in said continuous page based on a configurable page height and said determined line breaks for said positioning of said tagged anchored floats and said tagged footnotes on a subsequent page on non-availability of said space on said current page;

a fourteenth computer program code for grouping said marked-up content with said positioned anchored floats and said positioned footnotes on each page; and a fifteenth computer program code for inserting one or more of a plurality of pagination elements on said each page containing said grouped marked-up content; and a sixteenth computer program code for rendering said grouped marked-up content with said inserted one or more of said pagination elements in said reversible second file format, wherein said reversible second file format allows said marked-up content to be reversed to said first file format to restore said continuous page.

18. The computer program product of claim 17, wherein said ninth computer program code positions said tagged anchored floats proximal to associated float citations on said current page based on said availability of said space for said tagged anchored floats on said current page.

19. The computer program product of claim 17, wherein said twelfth computer program code positions said tagged footnotes proximal to associated footnote citations on said current page based on said availability of said space for said tagged footnotes on said current page.

\* \* \* \* \*